United States Patent
Suzuki et al.

(10) Patent No.: US 6,784,961 B2
(45) Date of Patent: Aug. 31, 2004

(54) APPARATUS AND METHOD FOR DISPLAYING IMAGE

(75) Inventors: Yoshio Suzuki, Kanagawa (JP); Sou Miyasaka, Tokyo (JP); Yoshiki Shirochi, Chiba (JP); Takeshi Tanimoto, Saitama (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 09/870,327

(22) Filed: May 30, 2001

(65) Prior Publication Data

US 2002/0018162 A1 Feb. 14, 2002

(30) Foreign Application Priority Data

May 31, 2000 (JP) ........................................ 2000-163125
Jun. 28, 2000 (JP) ........................................ 2000-194224

(51) Int. Cl.[7] .......................................... G02F 1/1335
(52) U.S. Cl. ........................................ 349/117; 349/119
(58) Field of Search ............................... 349/117, 118, 349/121, 96, 5, 119

(56) References Cited

U.S. PATENT DOCUMENTS

| | | | |
|---|---|---|---|
| 5,490,006 A | * 2/1996 | Masumoto et al. | 349/117 |
| 5,570,215 A | * 10/1996 | Omae et al. | 349/117 |
| 5,684,548 A | 11/1997 | Ariki et al. | |
| 5,978,055 A | 11/1999 | Van De Witte et al. | |
| 5,986,733 A | * 11/1999 | Winker et al. | 349/120 |
| 6,124,913 A | * 9/2000 | Mazaki et al. | 349/117 |
| 6,320,628 B1 | * 11/2001 | Tsujikawa et al. | 349/9 |
| 6,556,266 B1 | * 4/2003 | Shirochi et al. | 349/118 |

FOREIGN PATENT DOCUMENTS

| | | |
|---|---|---|
| EP | 0 576 304 | 12/1993 |
| EP | 0 622 656 | 11/1994 |
| EP | 1 077 387 | 2/2001 |

* cited by examiner

*Primary Examiner*—Robert H. Kim
*Assistant Examiner*—David Y. Chung
(74) *Attorney, Agent, or Firm*—Frommer Lawrence & Haug LLP; William S. Frommer

(57) ABSTRACT

Provided is a projection type liquid crystal display apparatus, which can improve black-level display and thus can display a higher-contrast image as compared to the related art. An optical compensator is located on the light exit side with respect to the liquid crystal display device so as to compensate for the optical phase difference caused by liquid crystal molecules in a light-entry-side region of the liquid crystal layer. As the optical compensator is located on the light exit side with respect to the liquid crystal display device, birefringence, caused by the liquid crystal molecules present in the light-entry-side region, is compensated for without being influenced by a microlenses provided in the liquid crystal plane. Consequently, the apparatus can improve the black-level display and thus can display a higher-contrast image as compared to the related art. Further, a phase difference caused by the birefringence of the nematic liquid crystal molecule is compensated for by using a substance having properties optically opposite to the positive crystal, namely, a substance having birefringence equivalent to birefringence of a negative crystal.

5 Claims, 28 Drawing Sheets

| Angle of inclination(°) | -40 | -30 | -25 | -20 | -15 | -10 | -5 | 0 | 5 |
|---|---|---|---|---|---|---|---|---|---|
| Contrast | 3832 | 4481 | 4885 | 5016 | 4627 | 3797 | 2877 | 2113 | 1559 |
| Improvement ratio | 1.59 | 1.86 | 2.02 | 2.08 | 1.92 | 1.57 | 1.19 | 0.88 | 0.65 |

FIG. 14

APPARATUS AND METHOD FOR
DISPLAYING IMAGE

BACKGROUND OF THE INVENTION

1. Field of the Invention

The invention relates to a liquid crystal projector apparatus and more particularly to a liquid crystal projector apparatus adapted to prevent deterioration in contrast and uniformity due to properties of dependence on viewing angles.

2. Description of the Related Art

A projector apparatus for projecting an image on a screen under magnification and thus implementing a large screen is in widespread use as an image display apparatus for indoor and outdoor use. The projector apparatus is broadly divided into a projector apparatus (a CRT projector apparatus) for projecting exiting light from a fluorescent screen of a CRT onto a screen and a projector apparatus for projecting modulated light onto a screen after modulating light emitted from a light source by means of a spatial light modulator, and, in the case of the latter, a projector apparatus (a liquid crystal projector apparatus) using a liquid crystal panel as the spatial light modulator is in the mainstream.

FIG. 1 shows an example of a configuration of an optical system of a liquid crystal projector apparatus of the related art (an optical system of a three-panel transmission type liquid crystal projector apparatus using three transmission type liquid crystal panels for RGB).

A light source 11 includes a lamp 12 (e.g., a xenon lamp), and a reflector 13 for reflecting light (white unpolarized light) emitted from the lamp 12 so as to form the light into a bundle of rays having a predetermined angle of divergence. Light emitted from the light source 11 passes through microlens arrays 14 and 15 and a polarizer 16 in sequence.

The microlens arrays 14 and 15 comprise an array of a plurality of microlenses 14a and an array of a plurality of microlenses 15a, respectively (for example, each lens has a diameter of about 1 mm to 5 mm). Each lens 14a is rectangular and similar in shape to a panel surface of each of transmission type liquid crystal modules 28, 29 and 30 in order that light exiting from the lens 14a may be focused on a panel surface of each of liquid crystal panels 42 to be described later.

The microlens array 15 is located substantially on a focal point of the lenses 14a. One each of the lenses 15a corresponds to one each of the lenses 14a and each lens 15a has such a shape that the most possible light exiting from the corresponding lens 14a can enter into the lens 15a.

The microlens arrays 14 and 15 allow the emitted light from the light source 11 to uniformly enter into the panel surface of the liquid crystal panel, thereby serving to improve uniformity of an image to be displayed on a screen (the uniformity refers to the uniformity of brightness or color for displaying an image of the same brightness or color over the overall screen).

The polarizer 16 is a device for converting most of incoming unpolarized light into linearly polarized light (e.g., p-polarized light) and then allowing the linearly polarized light to exit. The polarizer 16 serves to improve the efficiency of utilization of the emitted light from the light source 11 and also serves to improve contrast of an image to be displayed on a screen by increasing the quantity of exiting light from the liquid crystal panel at the time of white display.

The p-polarized light exiting from the polarizer 16 is focused and impinges on a dichroic mirror 18 by a lens 17. For example, the dichroic mirror 18 transmits red light of RGB light and reflects green light and blue light. Red p-polarized light passing through the dichroic mirror 18 is reflected by a mirror 19, and the reflected light is focused on and enters into a liquid crystal module 28 by a lens 20.

Green p-polarized light and blue p-polarized light reflected by the dichroic mirror 18 impinge on a dichroic mirror 21. For example, the dichroic mirror 21 transmits blue light and reflects green light. The green p-polarized light reflected by the dichroic mirror 21 is focused on and enters into a liquid crystal module 29 by a lens 22.

The blue p-polarized light passing through the dichroic mirror 21 is repeatedly focused and reflected by a lens 23, a mirror 24, a lens 25, a mirror 26 and a lens 27, and then the light enters into a liquid crystal module 30.

The liquid crystal modules 28, 29 and 30 have the same configuration. FIG. 2 shows an example of a configuration of an optical system of each of the liquid crystal modules 28, 29 and 30. A sheet polarizer 41 is located close to the entry side of the transmission type liquid crystal panel 42, and a polarizer 47 is located close to the exit side of the liquid crystal panel 42. The polarizer 41 has the orientation of the axis of polarization (the axis of light transmission) which is determined so as to allow the p-polarized light to pass through the polarizer 41. Therefore, the red p-polarized light, green p-polarized light and blue p-polarized light entering into the liquid crystal modules 28, 29 and 30, respectively, pass through the polarizers 41 as they are, and enter into the liquid crystal panels 42.

The liquid crystal panel 42 is a TN (twisted nematic) liquid crystal panel, and changes the locus of a resultant electric field vector of light passing through liquid crystal molecules according to the level of a voltage applied to the liquid crystal molecules. A voltage is applied to the liquid crystal molecules of pixels of the liquid crystal panels 42 of the liquid crystal modules 28, 29 and 30 in normally white mode according to the levels of video signals for red, green and blue. For example, an active matrix drive system is adopted as a system for driving the liquid crystal panel 42.

Microlenses 44, one each of which corresponds to one each of the pixels, are provided in a substrate 43 on the entry side of the liquid crystal panel 42. The microlenses 44 are lenses for focusing light incident on the corresponding pixels on effective display area portions of the pixels (i.e., portions having no electrode, switching device and so on and thus capable of allowing light to pass through the portions). The microlenses 44 serve to substantially increase an ratio aperture of the liquid crystal panel 42 and also serve to improve the contrast of an image by increasing the quantity of exiting light from the liquid crystal panel 42 at the time of white display.

Light, which passes through a liquid crystal layer 45 of the liquid crystal panel 42 and then exits through a substrate 46 on the exit side, enters into the polarizer 47. The orientation of the axis of polarization of the sheet polarizer 47 is perpendicular to that of the polarizer 41, and therefore the polarizer 47 allows s-polarized light to pass through the polarizer 47.

Red s-polarized light, green s-polarized light and blue s-polarized light passing through the polarizers 47 of the liquid crystal modules 28, 29 and 30 enter into a dichroic prism 31 from three directions, as shown in FIG. 1. The dichroic prism 31 has a filter film 31a for transmitting green light from the liquid crystal module 29 and reflecting red light from the liquid crystal module 28 in the same direction as the green light, and a filter film 31b for transmitting green light from the liquid crystal module 29 and reflecting blue light from the liquid crystal module 30 in the same direction as the green light. The red s-polarized light, green s-polarized light and blue s-polarized light are combined into one bundle of rays by the dichroic prism 31.

The s-polarized light exiting from the dichroic prism 31 is projected onto a screen (not shown) via a projection optical system 32.

As shown in FIGS. 1 and 2, the liquid crystal projector apparatus of the related art is devised to improve the uniformity by the microlens arrays 14 and 15 provided in a lighting optical system for guiding light emitted from the light source 11 to the liquid crystal modules 28, 29 and 30, to improve the contrast by the polarizer 16 provided in the lighting optical system, and to improve the contrast by the microlenses 44 provided in the substrate 43 on the entry side of each of the liquid crystal panels 42 of the liquid crystal modules 28, 29 and 30.

A TN liquid crystal panel and an STN (supertwisted nematic) liquid crystal panel have properties of being incapable of changing the locus of a resultant electric field vector of light incident obliquely on a panel surface according to initial level (according to the level of an applied voltage). This is called properties of dependence on viewing angles.

As shown in FIG. 18, the properties of dependence on viewing angles result from tilt angles (pretilt angles) p1 and p2 of liquid crystal molecules 53 to rubbing directions 51a and 52a of the respective alignment layers of substrates 51 and 52 on the entering and exit sides of a liquid crystal panel, respectively (corresponding to the substrates 43 and 46, respectively, in FIG. 7). Due to the existence of the pretilt angles, when passing through liquid crystal molecules, light incident obliquely on a panel surface produces phase shift between extraordinary light and ordinary light in a plane parallel to the panel surface and also produces phase shift between extraordinary light and ordinary light even in a plane perpendicular to the panel surface. As a result, it becomes impossible to change the locus of a resultant electric field vector of the incident light according to initial level.

In a liquid crystal display using a TN liquid crystal panel or an STN liquid crystal panel, due to the properties of dependence on viewing angles, even in normally white mode, linearly polarized light (e.g., p-polarized light) entering obliquely into the liquid crystal panel through pixels to display black (i.e., pixels to which a voltage is applied so that liquid crystal molecules may be aligned perpendicularly to a substrate) changes into elliptically polarized light, which then exits from the liquid crystal panel through the pixels. Then, s-polarized light component of the elliptically polarized light pass through an analyzer and are then projected onto a screen (that is, black stands out), and therefore the contrast may deteriorate.

FIG. 19 illustrates the correlation between an incident angle of light to a liquid crystal panel and the degree of deterioration in contrast. The greater an incident angle θ becomes, the lower contrast CR becomes, regardless of an incident direction φ in a plane parallel to a panel surface of the liquid crystal panel.

The degree of phase shifts due to the pretilt angles changes according to a cell gap length of a liquid crystal panel (i.e., a distance between two substrates which liquid crystal molecules are sandwiched between). In the case where the cell gap lengths vary according to parts of the liquid crystal panel, even when an image of the same brightness over the overall screen should be displayed (voltages on the same level are applied to all pixels), the properties of dependence on viewing angles cause variations in the transmittance of light passing through an analyzer after entering obliquely into the liquid crystal panel and then exiting from the liquid crystal panel, according to the parts of the liquid crystal panel, and therefore the brightness of the image may become nonuniform (that is, the uniformity may deteriorate).

As described above, an image display apparatus using a liquid crystal panel may deteriorate in contrast and uniformity due to the properties of dependence on viewing angles resulting from the existence of the pretilt angles. Although a direct-vision type liquid crystal display is designed in consideration of the properties of dependence on viewing angles, a liquid crystal projector apparatus that is a projection type liquid crystal display is not so devised as to improve the contrast and uniformity in consideration of the properties of dependence on viewing angles.

The reason why the direct-vision type liquid crystal display is designed in consideration of the properties of dependence on viewing angles is as follows: the quantity of light entering obliquely into the liquid crystal panel is large because an angle of divergence of light emitted from a light source is great, and moreover a screen is often viewed obliquely, so that the light entering obliquely into the liquid crystal panel and then exiting from the liquid crystal panel reaches to the eyes.

The reason why the liquid crystal projector apparatus is designed without the consideration of the properties of dependence on viewing angles is as follows: the apparatus has been heretofore designed in consideration of only linearly polarized light incident from a direction perpendicular to a panel surface, because a bundle of substantially parallel rays has been emitted from a light source and the emitted rays have entered into the liquid crystal panel via a lighting optical system while remaining substantially parallel.

However, even the liquid crystal projector apparatus recently has had a tendency to increase a range of an incident angle of light to the liquid crystal panel by increasing the angle of divergence of light emitted from the light source or by reducing the f-number of the lighting optical system, for the purpose of displaying a brighter image.

Even in the liquid crystal projector apparatus shown in FIGS. 1 and 2, the f-number of the lighting optical system is reduced so that the incident angle of light to each of the liquid crystal panels 42 of the liquid crystal modules 28, 29 and 30 lies between about plus and minus 10 to 15 degrees, for example. Therefore, p-polarized light entering obliquely into the liquid crystal panel through pixels to display black changes into elliptically polarized light, which then exits from the liquid crystal panel through the pixels, and then s-polarized light components of the elliptically polarized light pass through the polarizer 47 and are then projected onto a screen, so that the contrast deteriorates.

When the cell gap lengths vary according to parts of the liquid crystal panels 42 of the individual liquid crystal modules 28, 29 and 30, or when the cell gap lengths of the liquid crystal panels 42 differ among the liquid crystal modules 28, 29 and 30, the brightness or color of an image to be displayed on a screen becomes nonuniform (that is, the uniformity deteriorates) even when an image of the same brightness or color over the overall screen should be displayed.

Therefore, even the liquid crystal projector apparatus recently has had to prevent deterioration in contrast and uniformity due to the properties of dependence on viewing angles.

Although the liquid crystal projector apparatus is configured so that the incident angle of light to each of the liquid crystal panels lies between about plus and minus 10 to 15 degrees, the liquid crystal projector apparatus has a much narrower range of the incident angle as compared to the direct-vision type liquid crystal display. Therefore, the deterioration in contrast and uniformity cannot be prevented even if a conventional approach for designing the direct-vision type liquid crystal display in consideration of the properties of dependence on viewing angles is adopted for the liquid crystal projector apparatus as it is.

SUMMARY OF THE INVENTION

The invention is designed to overcome the foregoing problems. It is an object of the invention to provide a projection type liquid crystal display apparatus, which can improve black-level display and thus can display a higher-contrast image as compared to the related art.

It is another object of the invention to prevent deterioration in contrast and uniformity due to properties of dependence on viewing angles through an approach suitable for a liquid crystal projector apparatus using a TN liquid crystal panel or an STN liquid crystal panel (in particular, a transmission type liquid crystal projector apparatus having liquid crystal panels each having microlenses for increasing a numerical aperture, as illustrated in FIGS. 1 and 2).

A liquid crystal projector apparatus of the invention including: a liquid crystal panel having microlenses for focusing incoming light on effective display area portions of pixels, the liquid crystal panel for changing a locus of a resultant electric field vector of light passing through liquid crystal molecules according to a voltage applied to the liquid crystal molecules; a polarizer for allowing linearly polarized light, which is contained in light emitted from a light source and has one direction of vibration, to enter into the liquid crystal panel; and an analyzer for allowing linearly polarized light, which is contained in light exiting from the liquid crystal panel and has one direction of vibration, to enter into a projection optical system comprises: an optical compensator located between the liquid crystal panel and the analyzer and having birefringence in planes parallel and perpendicular to a panel surface of the liquid crystal panel, the optical compensator for compensating for phase shifts due to pretilt angles by the birefringence when light passes through the liquid crystal molecules after entering obliquely into the liquid crystal panel.

In the liquid crystal projector apparatus, the optical compensator having the birefringence in the planes parallel and perpendicular to the panel surface of the liquid crystal panel is located between the liquid crystal panel and the analyzer (that is, close to the exit side of the liquid crystal panel), and the optical compensator compensates for the phase shifts due to the pretilt angles (i.e., phase shifts between extraordinary light and ordinary light in the planes parallel and perpendicular to the panel surface) by the birefringence of the optical compensator when light passes through the liquid crystal molecules after entering obliquely into the liquid crystal panel.

Light exiting from the liquid crystal panel after entering obliquely into the liquid crystal panel through pixels to display black decreases in transmittance when passing through the analyzer, because the optical compensator compensates for the phase shifts due to the pretilt angles and thus fewer linearly polarized light components pass through the analyzer. Therefore, a smaller quantity of light is projected onto a screen from the liquid crystal panel through the pixels to display black (that is, black is prevented from standing out), so that deterioration in contrast due to properties of dependence on viewing angles is prevented.

Even when cell gap lengths vary according to parts of the individual liquid crystal panels (that is, the degrees of phase shifts due to the pretilt angles differ among the parts), or even when the cell gap lengths differ among a plurality of liquid crystal panels (that is, the degrees of phase shifts due to the pretilt angles differ among the liquid crystal panels), the optical compensator compensates for the phase shifts due to the pretilt angles, so that deterioration in uniformity due to the properties of dependence on viewing angles is prevented.

If the optical compensator is located between the polarizer and the liquid crystal panel (that is, close to the entry side of the liquid crystal panel), light entering into the liquid crystal panel via the optical compensator is focused on the liquid crystal molecules by the microlenses and enters into the liquid crystal molecules, so that an incident angle of the light to the optical compensator differs from an actual incident angle of the light to the liquid crystal molecules. The degree of phase shifts due to the pretilt angle is determined by the actual incident angle of the light to the liquid crystal molecules. As a result, when the optical compensator is located close to the entry side, it becomes difficult to optimally compensate for the phase shifts due to the pretilt angle according to the actual incident angle of the light to the liquid crystal molecules.

On the other hand, when the optical compensator is located close to the exit side of the liquid crystal panel as in the case of the above-described liquid crystal projector apparatus, an actual incident angle of light to the liquid crystal molecules is equal to an exit angle of the light from the liquid crystal panel, so that an incident angle of the light to the optical compensator becomes equal to the actual incident angle of the light to the liquid crystal molecules. Therefore, it becomes easy to optimally compensate for the phase shifts due to the pretilt angle according to the actual incident angle of the light to the liquid crystal molecules.

Preferably, as an example, a phase difference film (generally called "a uniaxially oriented phase difference film") having birefringence only in a plane parallel to a film surface is located at an angle to a panel surface of the liquid crystal panel so as to function as the optical compensator.

To allow linearly polarized light having a direction of vibration perpendicular to the polarizer and the analyzer to pass through the polarizer and the analyzer (that is, in normally white mode), it is preferable as an example that either a phase delay axis or a phase advance axis of the uniaxially oriented phase difference film be perpendicular to a polarization axis of the polarizer (or the analyzer) and the uniaxially oriented phase difference film be inclined about an axis parallel to the polarization axis of the polarizer (or the analyzer).

This permits compensating for the phase shifts due to the pretilt angle on the entry side (or the exit side) independently of the phase shifts due to the pretilt angle on the exit side (or the entry side).

Furthermore, both the uniaxially oriented phase difference film whose phase delay axis or phase advance axis is perpendicular to the polarization axis of the polarizer and the uniaxially oriented phase difference film whose phase delay axis or phase advance axis is perpendicular to the polarization axis of the analyzer may be located. This allows compensating for both the phase shifts due to the pretilt angle on the entry side and the phase shifts due to the pretilt angle on the exit side independently of each other and therefore allows still more greatly enhancing the effect of improving the contrast and the uniformity.

Preferably, as another example, a phase difference film (generally called "a special biaxially oriented phase difference film" or "a viewing angle increasing film") having birefringence in planes parallel and perpendicular to a film surface is located parallel to the panel surface of the liquid crystal panel so as to function as the optical compensator. This allows minimizing the increase in a distance between the liquid crystal panel and the analyzer and therefore allows contributing to the downsized optical system of the liquid crystal projector apparatus.

A method of improving contrast of the invention of a liquid crystal projector apparatus including: a liquid crystal panel having microlenses for focusing incoming light on effective display area portions of pixels, the liquid crystal panel for changing a locus of a resultant electric field vector of light passing through liquid crystal molecules according to a voltage applied to the liquid crystal molecules; a polarizer for allowing linearly polarized light, which is contained in light emitted from a light source and has one direction of vibration, to enter into the liquid crystal panel; and an analyzer for allowing linearly polarized light, which is contained in light exiting from the liquid crystal panel and has one direction of vibration, to enter into a projection optical system includes: a first step of locating a first phase difference film between the liquid crystal panel and the analyzer, the first phase difference film having birefringence only in a plane parallel to a film surface and inclined at an angle to a panel surface of the liquid crystal panel; a second step of checking transmittance of light exiting from the liquid crystal panel through pixels to display black when the exiting light passes through the analyzer, while varying an angle of inclination of the first phase difference film, and then determining the angle of inclination according to the magnitude of the transmittance; a third step of calculating the magnitude of retardation of the first phase difference film in planes parallel and perpendicular to the panel surface, when the first phase difference film has the angle of inclination determined by the second step; and a fourth step of locating a second phase difference film instead of the first phase difference film between the liquid crystal panel and the analyzer in parallel with the panel surface, the second phase difference film having birefringence in planes parallel and perpendicular to a film surface and having the magnitude of retardation in the planes parallel and perpendicular to the film surface which is approximately equal to the magnitude of retardation in the planes parallel and perpendicular to the panel surface calculated by the third step.

In the method of improving contrast, the first phase difference film (the uniaxially oriented phase difference film) having the birefringence only in the plane parallel to the film surface is located at an angle to the panel surface of the liquid crystal panel between the liquid crystal panel and the analyzer, the transmittance of light exiting from the liquid crystal panel through the pixels to display black is checked at varying angles of inclination of the uniaxially oriented phase difference film when the exiting light passes through the analyzer, and then the angle of inclination of the uniaxially oriented phase difference film is determined according to the magnitude of the transmittance.

This allows determining the angle of inclination of the uniaxially oriented phase difference film so as to reduce the transmittance of light exiting through the pixels to display black when the exiting light passes through the analyzer (that is, so as to compensate for the phase shifts due to the pretilt angle).

Moreover, the uniaxially oriented phase difference film is located between the polarizer and the liquid crystal panel (that is, close to the exit side of the liquid crystal panel), and thus an incident angle of light to the uniaxially oriented phase difference film becomes equal to an actual incident angle of the light to the liquid crystal molecules. Therefore, it becomes easy to determine the angle of inclination so as to optimally compensate for the phase shifts due to the pretilt angle according to the actual incident angle of the light to the liquid crystal molecules.

In the method of improving contrast, subsequently, the magnitude of retardation of the uniaxially oriented phase difference film in the planes parallel and perpendicular to the panel surface is calculated when the uniaxially oriented phase difference film has the determined angle of inclination. Then, instead of the uniaxially oriented phase difference film, the second phase difference film (the viewing angle increasing film), which has the birefringence in the planes parallel and perpendicular to the film surface and has the magnitude of retardation in the planes parallel and perpendicular to the film surface that is approximately equal to the calculated magnitude of retardation in the planes parallel and perpendicular to the panel surface, is located parallel to the panel surface between the liquid crystal panel and the analyzer.

When an image is displayed by the liquid crystal projector apparatus having the above-described viewing angle increasing film, a smaller quantity of light is projected onto the screen from the liquid crystal panel through the pixels to display black, and therefore the deterioration in contrast due to the properties of dependence on viewing angles is prevented, so that the contrast is improved.

Even when the cell gap lengths vary according to parts of the individual liquid crystal panels, or even when the cell gap lengths differ among a plurality of liquid crystal panels, the phase shifts due to the pretilt angles are compensated for as described above, and thus the deterioration in uniformity due to the properties of dependence on viewing angles is prevented, so that the uniformity is improved.

Moreover, the viewing angle increasing film is located parallel to the panel surface, and this allows minimizing the increase in the distance between the liquid crystal panel and the analyzer and therefore allows contributing to the downsized optical system of the liquid crystal projector apparatus.

Furthermore, the above-described method can prevent the deterioration in contrast and uniformity due to the properties of dependence on viewing angles, even if the method is applied to a transmission type liquid crystal projector apparatus having liquid crystal panels having no microlens for increasing a numerical aperture. Therefore, the method of improving contrast and uniformity can be also put to common use for both a transmission type liquid crystal projector apparatus having liquid crystal panels each having microlenses and a transmission type liquid crystal projector apparatus having liquid crystal panels having no microlens.

Also in the method of improving contrast, to allow linearly polarized light having a direction of vibration perpendicular to the polarizer and the analyzer to pass through the polarizer and the analyzer (that is, in normally white mode), it is preferable as an example that, in the first step, either a phase delay axis or a phase advance axis of the uniaxially oriented phase difference film be made perpendicular to a polarization axis of the polarizer (or the analyzer) and the uniaxially oriented phase difference film be inclined about an axis parallel to the polarization axis of the polarizer (or the analyzer).

This permits compensating for the phase shifts due to the pretilt angle on the entry side (or the exit side) independently of the phase shifts due to the pretilt angle on the exit side (or the entry side).

Furthermore, the second, third and fourth steps may be performed when either the phase delay axis or the phase advance axis of the uniaxially oriented phase difference film is perpendicular to the polarization axis of the polarizer and when either the phase delay axis or the phase advance axis of the uniaxially oriented phase difference film is perpendicular to the polarization axis of the analyzer. This allows compensating for both the phase shifts due to the pretilt angle on the entry side and the phase shifts due to the pretilt angle on the exit side independently of each other and therefore allows still more greatly enhancing the effect of improving the contrast and the uniformity.

Preferably, the method of improving contrast further includes a fifth step of making fine adjustment of a rotational angle position of the viewing angle increasing film in the plane parallel to the film surface, after the fourth step of locating the viewing angle increasing film.

Fine adjustment can be performed for the magnitude of birefringence in the plane perpendicular to the panel surface by making fine adjustment of the rotational angle position of the viewing angle increasing film as described above. Therefore, the contrast and the uniformity can be improved by making fine adjustment of the magnitude of birefringence, even after the viewing angle increasing film is located.

A projection type liquid crystal display apparatus of the invention comprises: a light source for emitting light required for image display; a transmission type liquid crystal display device having a liquid crystal layer having an alignment of a plurality of twisted liquid crystal molecules, the liquid crystal display device for selectively applying a voltage to the liquid crystal layer in response to an image signal, thereby realigning the liquid crystal molecules and thus modulating light passing through the liquid crystal layer; a first optical compensator located on a light exit side with respect to the liquid crystal display device and containing a substance having birefringence equivalent to birefringence of a negative crystal, the first optical compensator for compensating for an optical phase difference caused by liquid crystal molecules in a light-entry-side region of the liquid crystal layer; and a projection lens for projecting the light modulated by the liquid crystal display device.

Desirably, the projection type liquid crystal display apparatus of the invention further comprises a second optical compensator located on the light exit side with respect to the liquid crystal display device, the second optical compensator for compensating for an optical phase difference caused by liquid crystal molecules in the light-exit-side region of the liquid crystal layer.

Desirably, the projection type liquid crystal display apparatus of the invention further comprises a third optical compensator located on the light exit side with respect to the liquid crystal display device, the third optical compensator for compensating for an optical phase difference caused by liquid crystal molecules present in a region of the liquid crystal layer excluding the light-entry-side region and the light-exit-side region. Desirably, the third optical compensator is made of, for example, a substance having birefringence equivalent to birefringence of a negative uniaxial crystal. For example, in the case where each of the liquid crystal molecules in the liquid crystal layer has birefringence equivalent to birefringence of a positive uniaxial crystal and where, in a state in which a voltage is applied to the liquid crystal layer, the liquid crystal molecules in the liquid crystal layer are realigned so that the major axes of the molecules change in position from a position parallel or about parallel to a plane of incidence of light to a position perpendicular or about perpendicular to the plane of incidence of light as they are situated farther from the light-entry-side region of the liquid crystal layer and closer to the center of the liquid crystal layer, the third optical compensator functions to compensate for an optical phase difference caused by the liquid crystal molecules aligned with the major axes thereof perpendicular to the plane of incidence of light. Desirably, molecules of the substance constituting the third optical compensator and having the birefringence are aligned so that the optic axes of the molecules are parallel to the major axes of the liquid crystal molecules to be compensated for, in a state in which a voltage is applied to the liquid crystal layer.

In the projection type liquid crystal display apparatus of the invention, the first optical compensator located on the light exit side with respect to the liquid crystal display device compensates for the optical phase difference caused by the liquid crystal molecules in the light-entry-side region of the liquid crystal layer.

In the projection type liquid crystal display apparatus of the invention, for example, in the case where each of the liquid crystal molecules in the liquid crystal layer has the birefringence equivalent to the birefringence of the positive uniaxial crystal and where, in a state in which a voltage is applied to the liquid crystal layer, the liquid crystal molecules in the liquid crystal layer are aligned so that the major axes of the molecules are perpendicular to the plane of incidence of light as they are situated farther from the light-entry-side region of the liquid crystal layer and closer to the center of the liquid crystal layer, the third optical compensator made of, for example, a substance having birefringence equivalent to birefringence of a negative uniaxial crystal compensates for the optical phase difference caused by the liquid crystal molecules aligned with the major axes thereof vertical.

BRIEF DESCRIPTION OF THE DRAWINGS

These and other objects and features of the present invention will become clear from the following description of the preferred embodiments given with reference to the accompanying drawings, in which:

FIG. 14 is a table of improvement ratio of contrast calculated from the result of simulation shown in FIG. 13;

DETAILED DESCRIPTION OF THE PREFERRED EMBODIMENTS

[First Embodiment]

Figure 6:
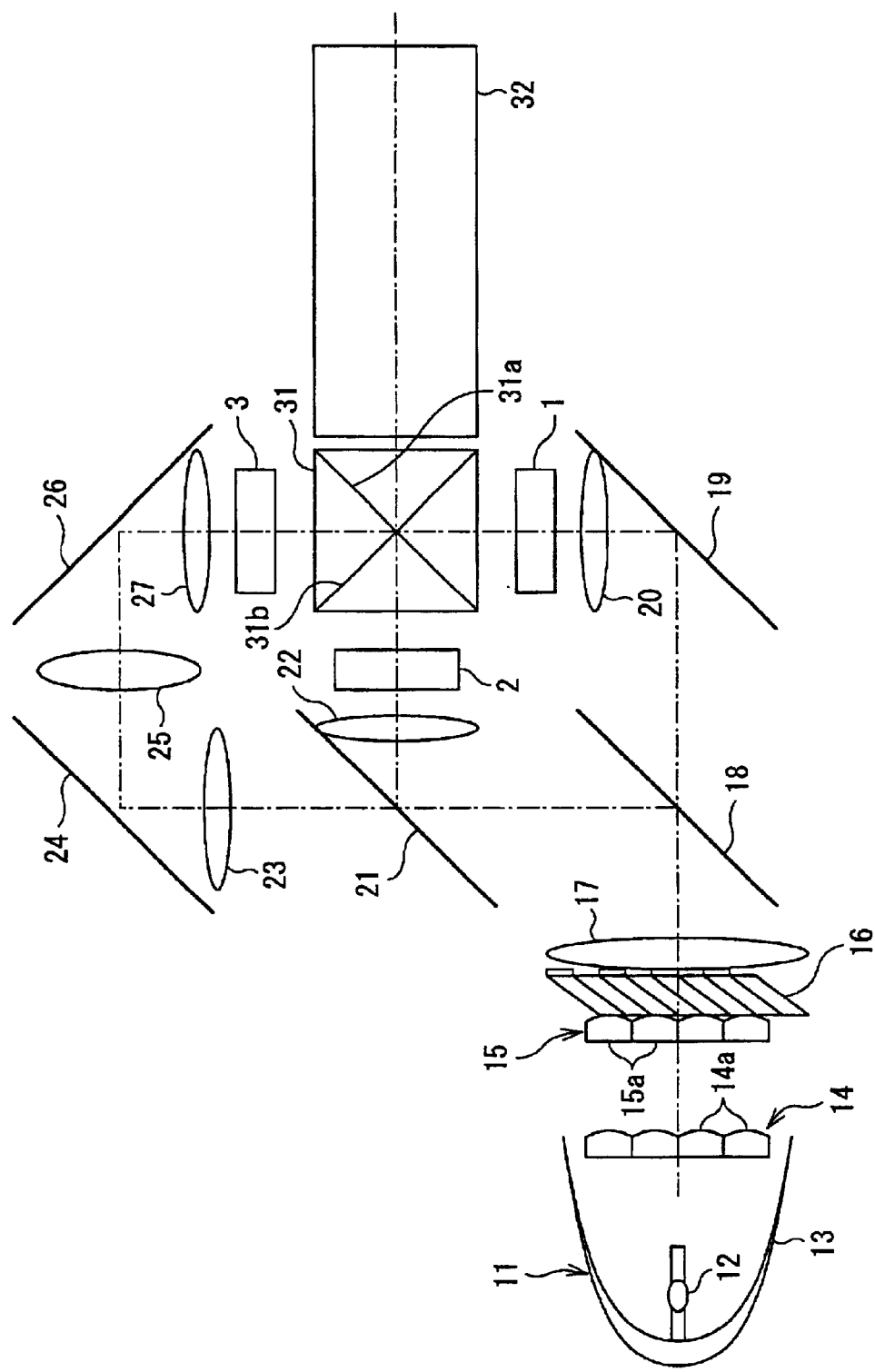
FIG. 6 shows an example of a configuration of an optical system of a three-panel transmission type liquid crystal projector apparatus to which the invention is applied.

A first embodiment of the invention will be described below with reference to the drawings. FIG. 6 shows an example of a configuration of an optical system of a three-panel transmission type liquid crystal projector apparatus to which the invention is applied. Parts of the optical system, except for liquid crystal modules 1, 2 and 3, have common configurations with those of an optical system of a three-panel transmission type liquid crystal projector apparatus shown in FIG. 1, and thus the parts are indicated by the same reference numerals as the reference numerals in FIG. 1.

Figure 2:
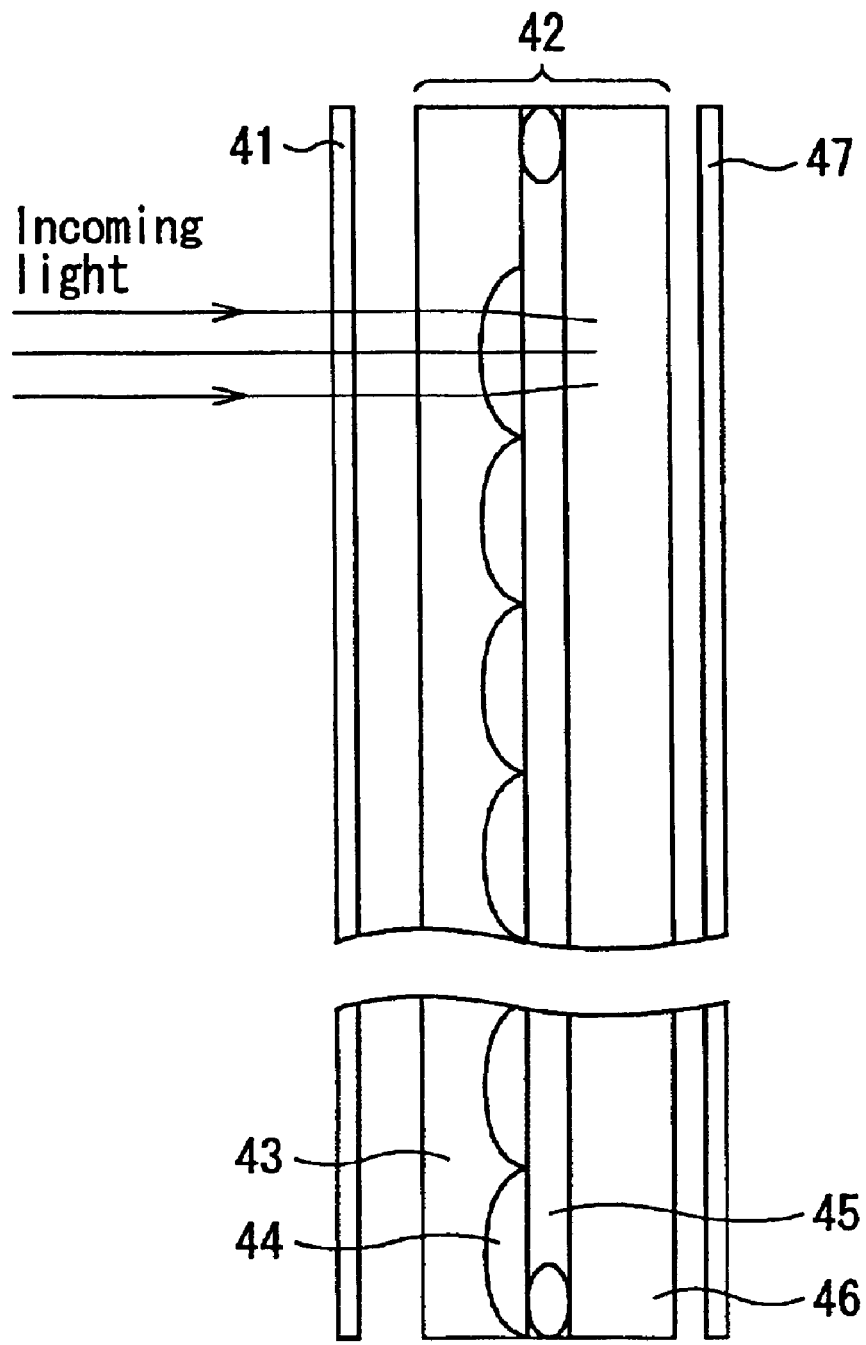
FIG. 2 shows an example of a configuration of an optical system of each of liquid crystal modules shown in FIG. 1.
Figure 7:
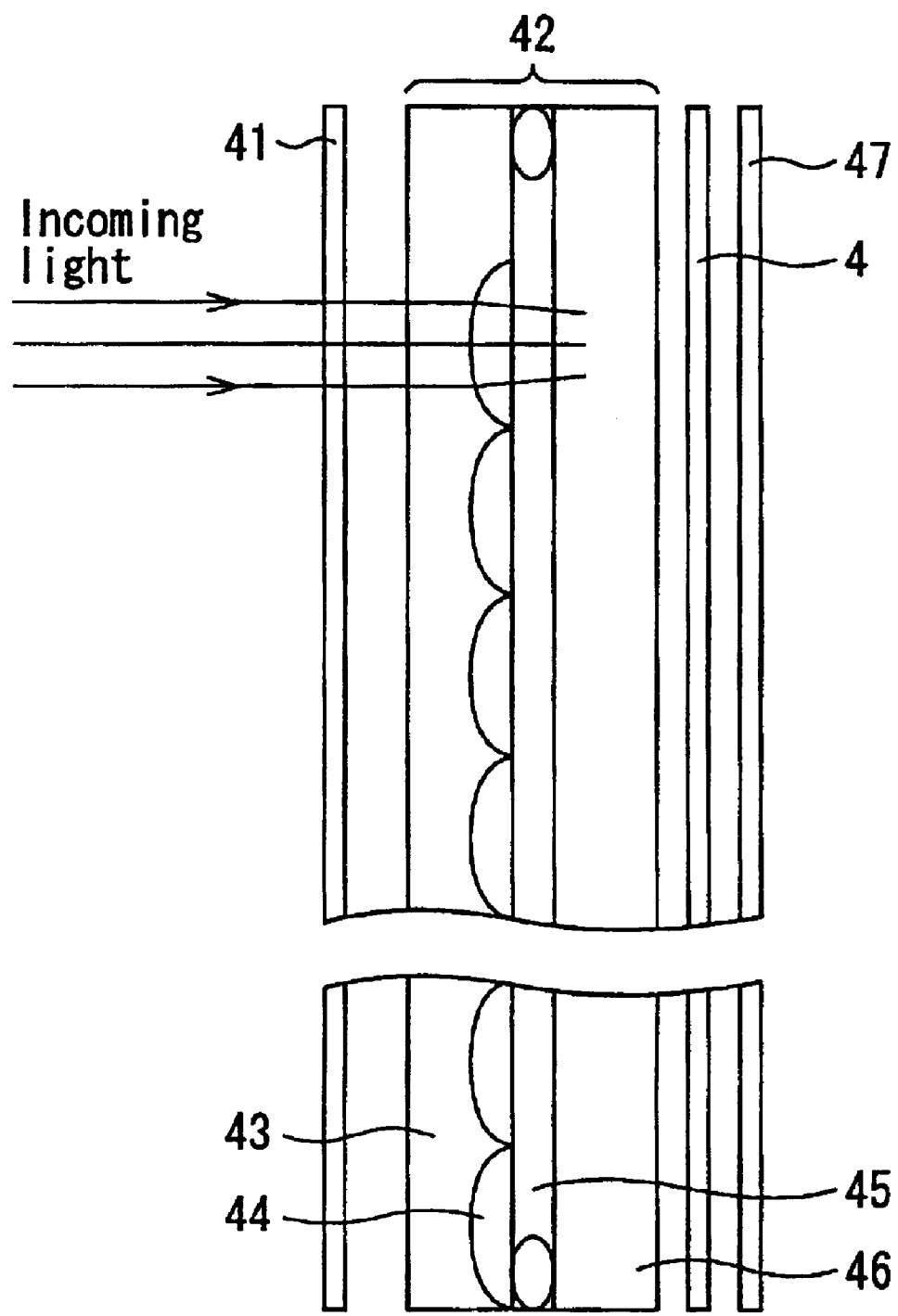
FIG. 7 shows an example of a configuration of an optical system of each of liquid crystal modules shown in FIG. 6.

The liquid crystal modules 1, 2 and 3 have the same configuration. FIG. 7 shows an example of a configuration of an optical system of each of the liquid crystal modules 1, 2 and 3, and parts having common configurations with parts shown in FIG. 2 are indicated by the same reference numerals as the reference numerals in FIG. 2. The invention is characterized by that, in each of the liquid crystal modules 1, 2 and 3, a viewing angle increasing film 4 is located parallel to a panel surface of a liquid crystal panel 42 between the liquid crystal panel 42 and a polarizer (an analyzer) 47 (that is, close to the exit side of the liquid crystal panel 42).

The viewing angle increasing film 4 has birefringence in planes parallel and perpendicular to a film surface. Because of the birefringence, the viewing angle increasing film 4 serves to compensate for phase shifts due to pretilt angles of liquid crystal molecules which light entering obliquely into the liquid crystal panel 42 passes through (i.e., phase shifts between extraordinary light and ordinary light in planes parallel and perpendicular to the panel surface).

Light exiting from the liquid crystal panel 42 after entering obliquely into the liquid crystal panel 42 through pixels to display black decreases in transmittance when passing through the polarizer 47, because the viewing angle increasing film 4 compensates for the phase shifts due to the pretilt angles and thus fewer linearly polarized light components pass through the polarizer 47. Thus, a smaller quantity of light is projected onto a screen from the liquid crystal panel 42 through the pixels to display black (that is, black is prevented from standing out), and therefore deterioration in contrast due to properties of dependence on viewing angles is prevented, so that the contrast is improved.

When cell gap lengths vary according to parts of the liquid crystal panels 42 of the individual liquid crystal modules 1, 2 and 3 (that is, the degrees of phase shifts due to the pretilt angles differ among the parts), or when the cell gap lengths of the liquid crystal panels 42 differ among the liquid crystal modules 1, 2 and 3 (that is, the degrees of phase shifts due to the pretilt angles differ among the liquid crystal modules 1, 2 and 3), deterioration in uniformity due to the properties of dependence on viewing angles is prevented by compensating for the phase shifts due to the pretilt angles, so that the uniformity is improved.

The magnitude of retardation of the viewing angle increasing film 4 to be used is determined by the following method.

Figure 8:
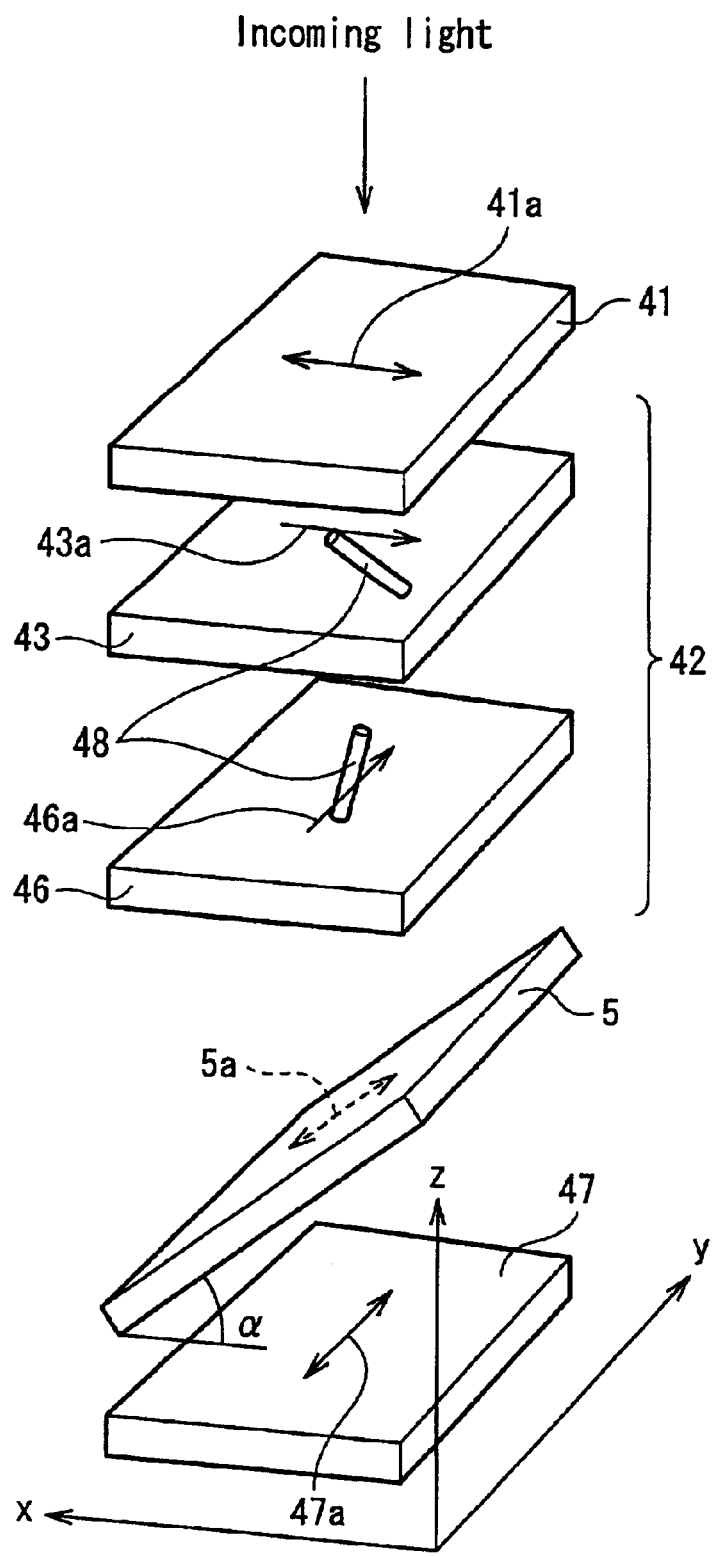
FIG. 8 shows the arrangement of a uniaxially oriented phase difference film.

First of all, as shown in FIG. 8, a uniaxially oriented phase difference film 5 (that is a phase difference film having birefringence only in a plane parallel to a film surface and is sometimes called a phase difference film hereinafter) is located between the liquid crystal panel 42 and the polarizer 47 in such a manner that a phase delay axis 5a of the film 5 is perpendicular to a polarization axis 47a of the polarizer 47 and that the film 5 is inclined at an angle α to the plane (the x-y plane) parallel to the panel surface of the liquid crystal panel 42 about an axis (the y-axis) parallel to the polarization axis 47a.

For illustrating the liquid crystal panel 42, FIG. 8 shows a substrate 43 on the entry side of the liquid crystal panel 42, a rubbing direction 43a of an alignment layer on the substrate 43, a substrate 46 on the exit side of the liquid crystal panel 42, a rubbing direction 46a of an alignment layer on the substrate 46, and liquid crystal molecules 48 in a liquid crystal layer 45, which are adjacent to the substrates 43 and 46. FIG. 8 does not show microlenses 44 (see FIG. 7) of the substrate 43.

Figure 9:
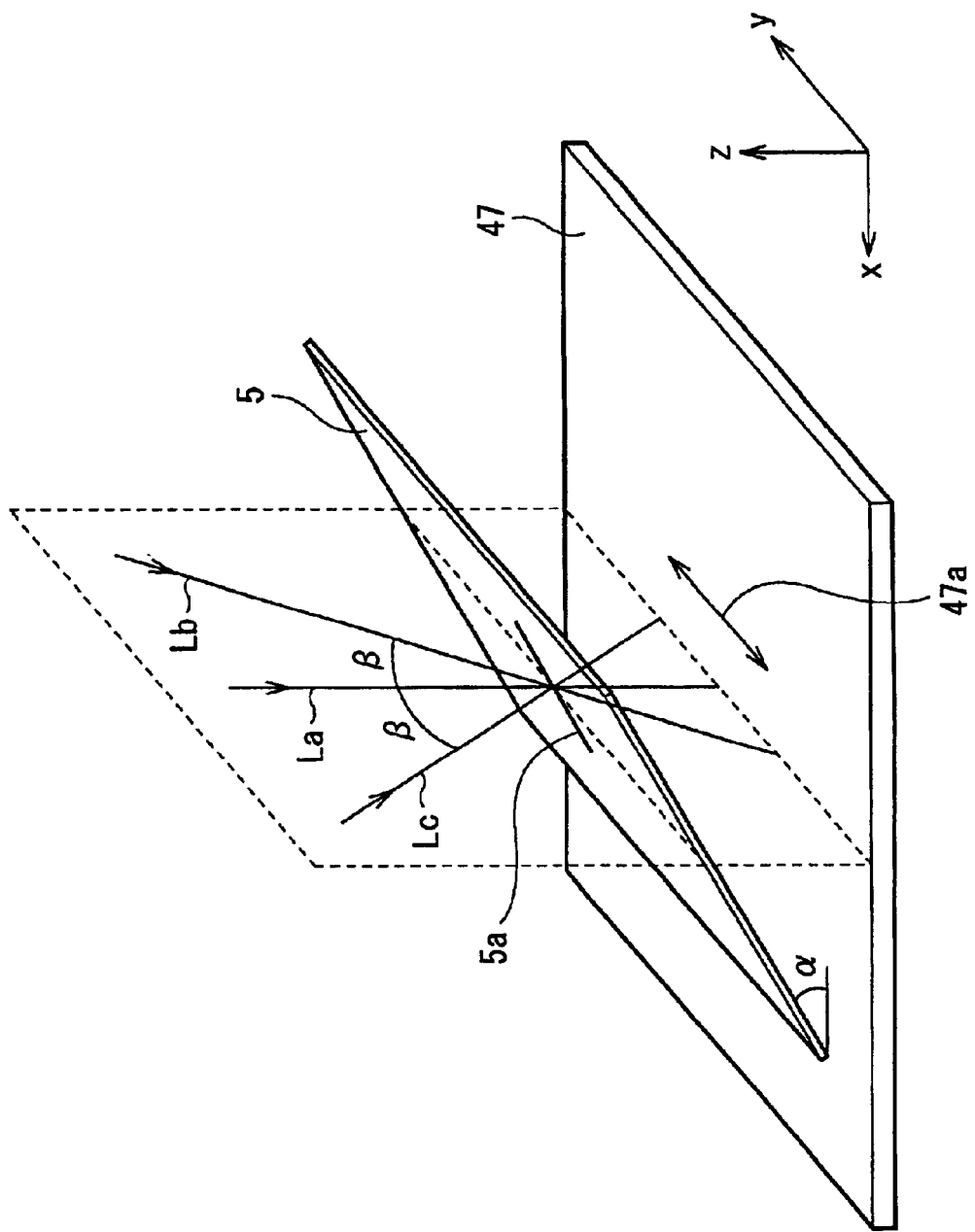
FIG. 9 shows a state in which light exiting from a liquid crystal panel passes through the uniaxially oriented phase difference film.

FIG. 9 shows a state in which light La, light Lb and light Lc of exiting light from the liquid crystal panel 42, which pass through a plane (the z-y plane) perpendicular to the panel surface of the liquid crystal panel 42 and parallel to the polarization axis 47a of the polarizer 47, pass through the phase difference film 5 in a state in which the phase difference film 5 is inclined as shown in FIG. 8.

The light La is light exiting in a direction (the z-axis direction) perpendicular to the panel surface of the liquid crystal panel 42. In other words, the light La is resulting light after p-polarized light exits from the liquid crystal panel 42 after entering into the liquid crystal panel 42 from the direction perpendicular to the panel surface. Therefore, the phase shifts due to the pretilt angles do not occur when the light La passes through the liquid crystal molecules.

As compared to the light La, the light Lb is light exiting at an angle $\beta$ to the right in the plane parallel to the polarization axis 47a. In other words, the light Lb is resulting light after p-polarized light exits from the liquid crystal panel 42 after entering into the liquid crystal panel 42 at an angle from the right in the z-y plane. The direction of the polarization axis 47a matches the rubbing direction 46a of the alignment layer of the substrate 46 on the exit side of the liquid crystal panel 42, as shown in FIG. 8. When the light Lb passes through the liquid crystal molecules, phase shifts between extraordinary light and ordinary light are caused in the x-y plane and the z-y plane by the pretilt angle on the exit side (i.e., a tilt angle of the liquid crystal molecule 48 to the rubbing direction 46a of the alignment layer of the substrate 46), thereby changing the locus of a resultant electric field vector of the light Lb and therefore changing the light Lb into elliptically polarized light.

The light Lc is light exiting at the angle $\beta$ to the left in the plane parallel to the polarization axis 47a. In other words, the light Lc is resulting light after p-polarized light exits from the liquid crystal panel 42 after entering into the liquid crystal panel 42 at an angle from the left in the z-y plane. When the light Lc passes through the liquid crystal molecules, phase shifts between extraordinary light and ordinary light (i.e., phase shifts opposite in direction to the phase shifts of the light Lb) are caused in the x-y plane and the z-y plane by the pretilt angle on the exit side, thereby changing the locus of a resultant electric field vector of the light Lc and therefore changing the light Lc into elliptically polarized light (i.e., elliptically polarized light opposite in direction to the elliptically polarized light which the light Lb changes into).

Figure 10A:
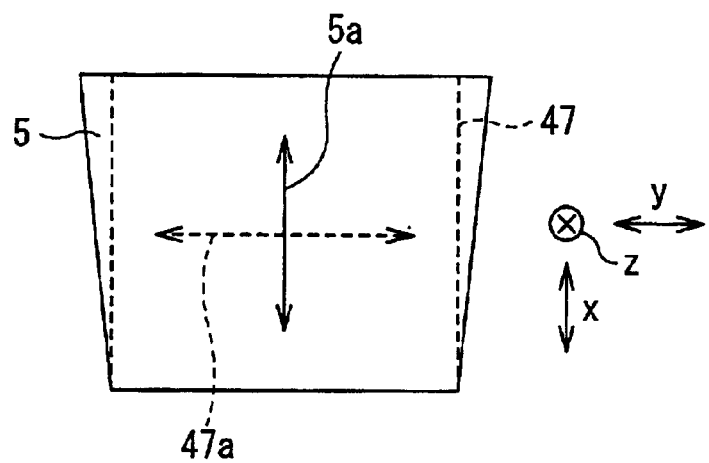
FIGS. 10A to 10C are illustrations of the uniaxially oriented phase difference film viewed from the light exit side.
Figure 10B:
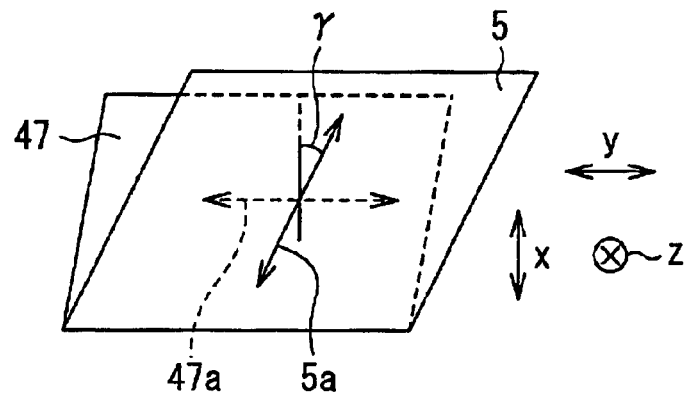
Figure 10C:
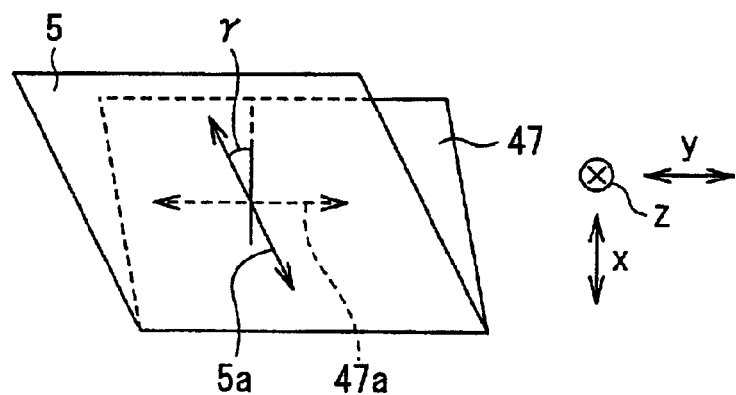

FIGS. 10A to 10C are illustrations of the phase difference film 5 viewed from the side through which the light La, the light Lb and the light Lc exit (i.e., the side of the polarizer 47). FIG. 10A is the illustration of the phase difference film 5 viewed from the direction in which the light La shown in FIG. 9 reaches. When viewed from this direction, the phase delay axis 5a of the phase difference film 5 is perpendicular to the direction of the polarization axis 47a. Therefore, the locus of the resultant electric field vector of the light La does not change when the light La passes through the phase difference film 5, so that the light La enters into the polarizer 47 while remaining the p-polarized light.

FIG. 10B is the illustration of the phase difference film 5 viewed from the direction in which the light Lb show in FIG. 9 reaches. When viewed from this direction, the phase delay axis 5a of the phase difference film 5 is inclined at an angle $\gamma$ to the right to the direction perpendicular to the direction of the polarization axis 47a. Therefore, the light Lb produces phase shifts between extraordinary light and ordinary light in the x-y plane and the z-y plane according to retardation of the phase difference film 5 in the x-y plane and the z-y plane, when passing through the phase difference film 5.

FIG. 10C is the illustration of the phase difference film 5 viewed from the direction in which the light Lc shown in FIG. 9 reaches. When viewed from this direction, the phase delay axis 6a of the phase difference film 5 is inclined at the angle $\gamma$ to the left to the direction perpendicular to the direction of the polarization axis 47a. Therefore, the light Lc produces phase shifts between extraordinary light and ordinary light in the x-y plane and the z-y plane (i.e., phase shifts opposite in direction to the phase shifts of the light Lb) according to the retardation of the phase difference film 5 in the x-y plane and the z-y plane, when passing through the phase difference film 5.

As described above, the light Lb and the light Lc are phase shifted in opposite directions in the x-y plane and the z-y plane, when passing through the phase difference film 5. The phase shifts, which are produced when the light Lb and the light Lc pass through the phase difference film 5, can therefore compensate for the phase shifts of the light Lb and the light Lc in the x-y plane and the z-y plane due to the pretilt angle on the exit side, which are produced when the light Lb and the light Lc pass through the liquid crystal molecules of the liquid crystal panel 42, (that is, the phase shifts can be reduced).

The magnitude of retardation of the phase difference film 5 in the x-y plane and the z-y plane changes according to the angle $\alpha$ of inclination of the phase difference film 5. That is, the degree of compensation for the phase shifts due to the pretilt angle on the exit side changes according to the angle $\alpha$ of inclination.

Then, transmittance of light exiting from the liquid crystal panel 42 through pixels to display black is checked at varying angles $\alpha$ of inclination of the phase difference film 5, when the exiting light passes through the polarizer 47. The angle $\alpha$ of inclination of the phase difference film 5 is determined so that the transmittance may be equal to or less than a local minimum or uniform value (that is, so as to compensate for the phase shifts due to the pretilt angle).

If the phase difference film 5 is located between a polarizer 41 (a polarizer) shown in FIG. 7 and the liquid crystal panel 42 (that is, close to the entry side of the liquid crystal panel 42), light entering into the liquid crystal panel 42 via the phase difference film 5 is focused on the liquid crystal molecules by the microlenses 44 and enters into the liquid crystal molecules (the liquid crystal layer 45), so that an incident angle of the light to the phase difference film 5 differs from an actual incident angle of the light to the liquid crystal molecules as shown in FIG. 7. The degree of phase shifts due to the pretilt angle is determined by the actual incident angle of the light to the liquid crystal molecules. As a result, when the phase difference film 5 is located close to the entry side, it becomes difficult to determine the angle $\alpha$ of inclination of the phase difference film 5 so as to optimally compensate for the phase shifts due to the pretilt angle according to the actual incident angle of the light to the liquid crystal molecules.

On the other hand, when the phase difference film 5 is located close to the exit side of the liquid crystal panel 42, an actual incident angle of light to the liquid crystal molecules is equal to an exit angle of the light from the liquid crystal panel 42, so that an incident angle of the light to the phase difference film 5 becomes equal to the actual incident angle of the light to the liquid crystal molecules. Therefore, it is easy to determine the angle α of inclination of the phase difference film 5 so as to optimally compensate for the phase shifts due to the pretilt angle according to the actual incident angle of the light to the liquid crystal molecules.

Even when the phase difference film 5 is located between the liquid crystal panel 42 and the polarizer 47 at the angle α of inclination determined in this manner, the phase shifts due to the pretilt angle on the exit side are compensated for, so that deterioration in contrast and uniformity due to the properties of dependence on viewing angles is prevented.

For size reduction of the optical system, it is, however, not preferable to manufacture the liquid crystal projector apparatus with the phase difference film 5 in such an inclined position, because a distance between the liquid crystal panel 42 and the polarizer 47 becomes longer.

A viewing angle increasing film having retardation equivalent to the retardation of the phase difference film 5 having the angle α of inclination is located parallel to the panel surface between the liquid crystal panel 42 and the polarizer 47, thereby allowing minimization of increase in the distance between the liquid crystal panel 42 and the polarizer 47.

Then, the magnitude of retardation of the viewing angle increasing film to be equivalent to the phase difference film 5 having the angle α of inclination is determined.

Figure 11:
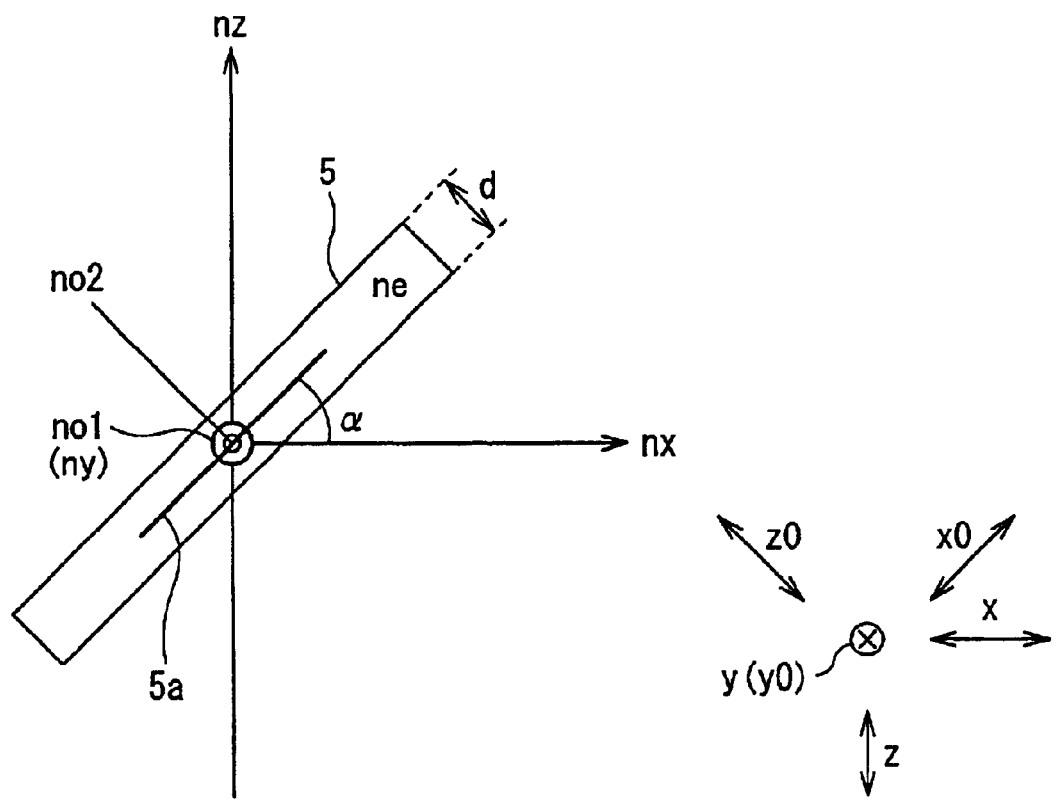
FIG. 11 shows a refractive index and a thickness of the uniaxially oriented phase difference film.

As shown in FIG. 11, a refractive index of the phase delay axis 5a of the phase difference film 5 is indicated by 'ne', a refractive index of a phase advance axis of the phase difference film 5 is indicated by 'no1', a refractive index of the phase difference film 5 in the direction perpendicular to the film surface is indicated by 'no2', and a thickness of the phase difference film 5 is indicated by 'd'. The respective values of ne, no1, no2 and d are known.

Refractive indices of the phase difference film 5 in the x-axis, y-axis and z-axis directions are indicated by 'nx', 'ny' and 'nz', respectively. A principal axis along the direction parallel to the phase delay axis 5a is indicated by 'x0', a principal axis along the direction parallel to the phase advance axis is indicated by 'y0' (in this case, the y0-axis direction is the same as the y-axis direction), and a principal axis along the direction perpendicular to the film surface is indicated by 'z0'.

Retardation Rxy and retardation Rzy of the phase difference film 5 in the x-y plane and the z-y plane of the liquid crystal panel 42 are expressed as the following equations (1) and (2), respectively, using d, nx, ny, nz and the angle α of inclination.

$$Rxy = (nx - ny)d / \cos \alpha \quad (1)$$

$$Rzy = (nz - ny)d / \cos \alpha \quad (2)$$

Figure 12:
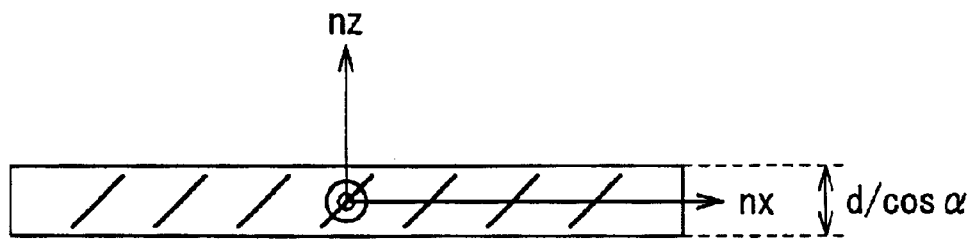
FIG. 12 shows a viewing angle increasing film having retardation equivalent to retardation of the uniaxially oriented phase difference film having an angle α of inclination.

The viewing angle increasing film having retardation equivalent to the retardation of the phase difference film 5 having the angle α of inclination has retardations equal to Rxy and Rzy in planes parallel and perpendicular to a film surface, respectively. That is, as shown in FIG. 12, the viewing angle increasing film has refractive indices of nx and ny in two orthogonal directions in the plane parallel to the film surface, a refractive index of nz in the plane perpendicular to the film surface, and a thickness of d/cos α.

A value of the refractive index ny is equal to no1 because the y0-axis direction is the same as the y-axis direction. Accordingly, what type of viewing angle increasing film is equivalent to the phase difference film 5 can be determined by calculating the respective values of the remaining refractive indices nx and nz. The values of nx and nz are calculated in the following manner.

The correlation between the values of x0, y0 and z0 and the values of ne, no1 and no2 is represented by an equation of an index ellipsoid expressed as the following equation (3).

$$\frac{x0^2}{ne^2} + \frac{y0^2}{no1^2} + \frac{z0^2}{no2^2} = 1 \quad (3)$$

As is apparent from FIG. 11, the correlation between the values of x0, y0 and z0 and the values of nx, ny and nz is expressed by the following equations (4) and (5).

$$x0 = nx \cdot \cos \alpha, \ y0 = 0, \ z0 = -nx \cdot \sin \alpha \quad (4)$$

$$x0 = nz \cdot \sin \alpha, \ y0 = 0, \ z0 = nz \cdot \cos \alpha \quad (5)$$

The equation (4) is substituted into the equation (3), whereby the value of nx is given by the following equation (6). The equation (5) is substituted into the equation (3), whereby the value of nz is given by the following equation (7). In this manner, what type of viewing angle increasing film is equivalent to the phase difference film 5 can be determined.

$$\frac{nx^2 \cos^2 \alpha}{ne^2} + \frac{nx^2 \sin^2 \alpha}{no2^2} = 1 \quad (6)$$

$$\therefore nx = \frac{1}{\sqrt{\frac{\cos^2 \alpha}{ne^2} + \frac{\sin^2 \alpha}{no2^2}}}$$

$$= \frac{ne \cdot no2}{\sqrt{no2^2 \cdot \cos^2 \alpha + ne^2 \cdot \sin^2 \alpha}}$$

$$\frac{nz^2 \sin^2 \alpha}{ne^2} + \frac{nz^2 \cos^2 \alpha}{no2^2} = 1 \quad (7)$$

$$\therefore nz = \frac{1}{\sqrt{\frac{\sin^2 \alpha}{ne^2} + \frac{\cos^2 \alpha}{no2^2}}}$$

$$= \frac{ne \cdot no2}{\sqrt{no2^2 \cdot \sin^2 \alpha + ne^2 \cdot \cos^2 \alpha}}$$

Then, a viewing angle increasing film having the retardation determined in the above-mentioned manner is provided. The viewing angle increasing film is used as the viewing angle increasing film 4 shown in FIG. 7.

The viewing angle increasing film 4 shown in FIG. 7 is configured in the following manner: that is, the magnitude of retardation of the viewing angle increasing film 4 to be used is determined by the above-described method, and then the viewing angle increasing film 4 is located parallel to the panel surface between the liquid crystal panel 42 of each of the liquid crystal modules 1, 2 and 3 and the polarizer 47 and is fixed to the liquid crystal panel 42 and the polarizer 47.

In the above-described method, an operation of checking the transmittance of light passing through the polarizer 47 at varying angles α of inclination of the phase difference film 5 may be performed in a situation where the phase difference film 5 is actually located between the liquid crystal panel 42 and the polarizer 47, or may be performed in simulation.

The applicant performed this operation in a simulation using a liquid crystal simulator "LCD MASTER" available from SHINTECH, Inc. That is, parameters such as a cell gap length and a dielectric constant, an elastic constant, rotational viscosity, a helical pitch and a pretilt angle of TN liquid crystal molecules were set for the liquid crystal panel 42, and the correlation between the level of a voltage applied to a TN liquid crystal panel and the distribution of directors (the orientations of the major-axis directions of the liquid crystal molecules) was calculated using the parameters. Then, in accordance with the director distribution, a refractive index of ordinary light and a refractive index of extraordinary light over the overall TN liquid crystal panel were calculated when the applied voltage was set at a level for displaying black and at an intermediate level.

In an optical model comprising a combination of the TN liquid crystal panel, a phase difference film (a quarter-wave plate or a ⅛-wave plate) and an analyzer arranged similarly to the liquid crystal panel 42, the phase difference film 5 and the polarizer 47 shown in FIG. 8, the correlation between an incident angle of light (of wavelength 550 nm) to the TN liquid crystal panel and transmittance of exiting light from the TN liquid crystal panel at the time of the passage of the light through the analyzer was calculated by a 4 by 4 matrix method at varying angles (indicated by α in FIG. 8) of inclination of the phase difference film. In the optical model, the retardations of the quarter-wave plate and the ⅛-wave plate were set to λ/4 and λ/8, respectively, without being changed, regardless of the magnitude of the angle α of inclination of the quarter-wave plate or the ⅛-wave plate (that is, even if a distance of the passage of the light through the quarter-wave plate or the ⅛-wave plate was longer than a thickness of the quarter-wave plate or the ⅛-wave plate).

Figure 13:
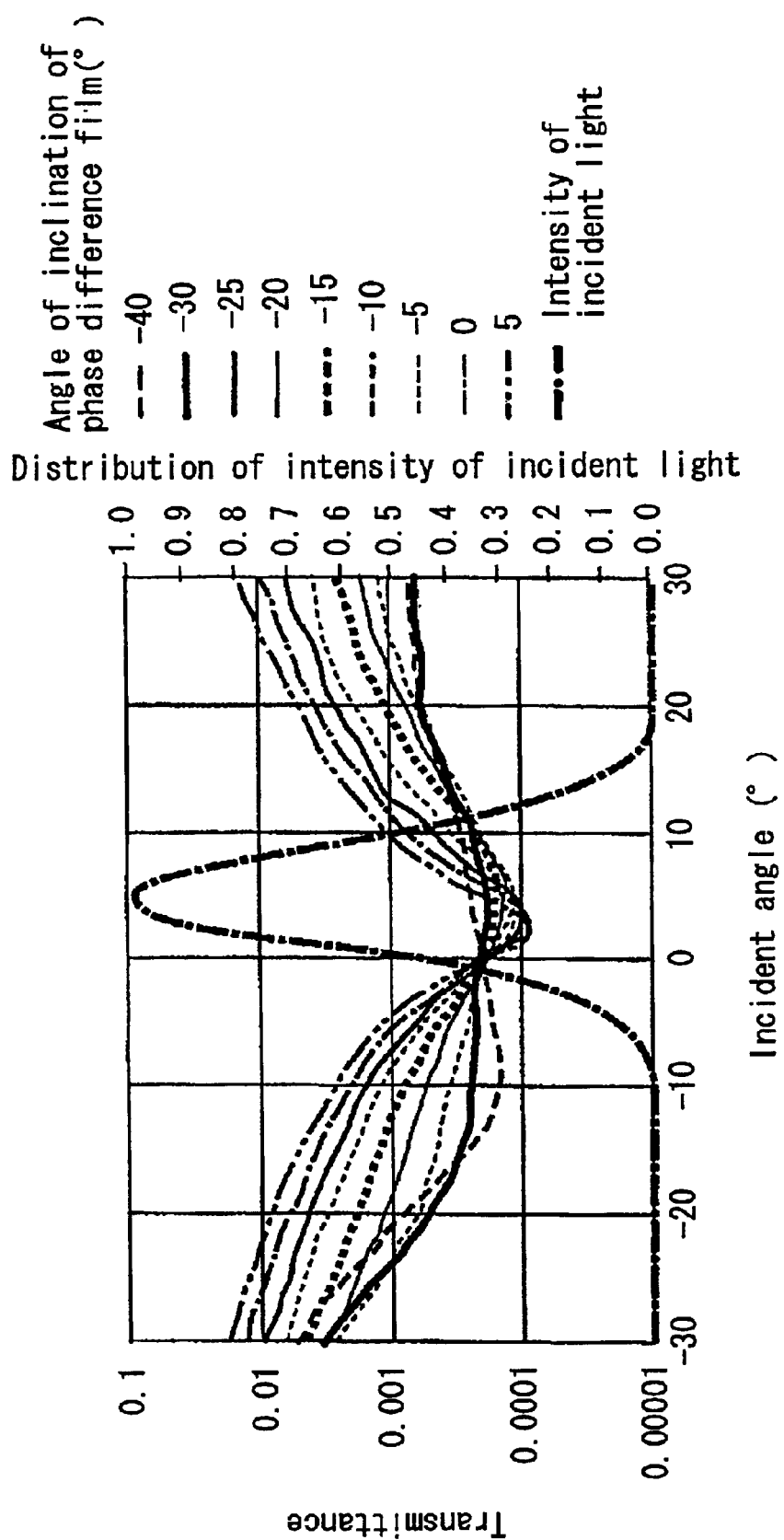
FIG. 13 is a graph of the result of simulation.

FIG. 13 shows the result of simulation of light exiting from the TN liquid crystal panel into a plane perpendicular to the panel surface and parallel to a polarization axis of the analyzer, similarly to the light La, the light Lb and the light Lc shown in FIG. 9, under conditions that the quarter-wave plate is used as the phase difference film and the applied voltage is set at the level for displaying black.

FIG. 13 also shows the correlation between the incident angle and the intensity of incident light calculated using parameters such as an angle of divergence, the center of luminance, dispersion and an attenuation index of a light source. From the correlation, it is shown that the incident angle of the light to the TN liquid crystal panel lies between about plus and minus 14 degrees.

FIG. 14 shows contrast values at incident angles between plus and minus 14 degrees calculated from the result of simulation shown in FIG. 13, and improvement ratios of contrast (i.e., the ratios of the contrast values to a contrast value, 2414, calculated using an optical model having no quarter-wave plate), at each of angles of inclination of the quarter-wave plate. It is shown that the contrast is most greatly improved near an angle of inclination of 20 degrees when the quarter-wave plate is used as the phase difference film.

Figure 15:
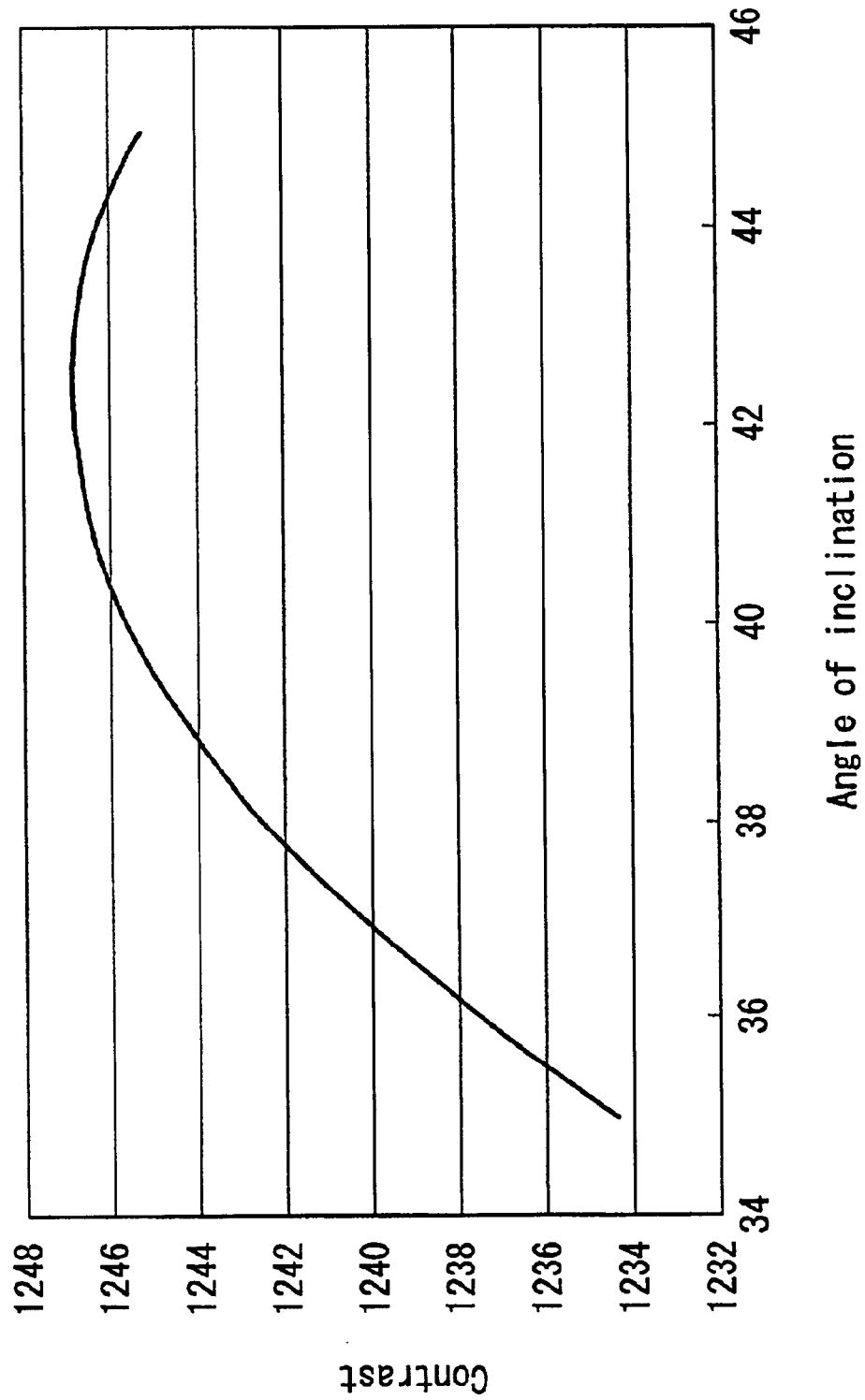
FIG. 15 is a graph of the correlation between an angle of inclination and contrast calculated from the result of simulation.

FIG. 15 shows the correlation between contrast values at incident angles between plus and minus 14 degrees calculated from the result of simulation and angles of inclination of the ⅛-wave plate (the contrast values do not correspond directly to the values shown in FIG. 14 because the contrast values are relative values), after the simulation of light exiting from the TN liquid crystal panel into the plane perpendicular to the panel surface and parallel to the polarization axis of the analyzer under conditions that the ⅛-wave plate is used as the phase difference film and the applied voltage is set at the level for displaying black. It is shown that the contrast is most greatly improved near an angle of inclination of 42 degrees when the ⅛-wave plate is used as the phase difference film.

Figure 16:
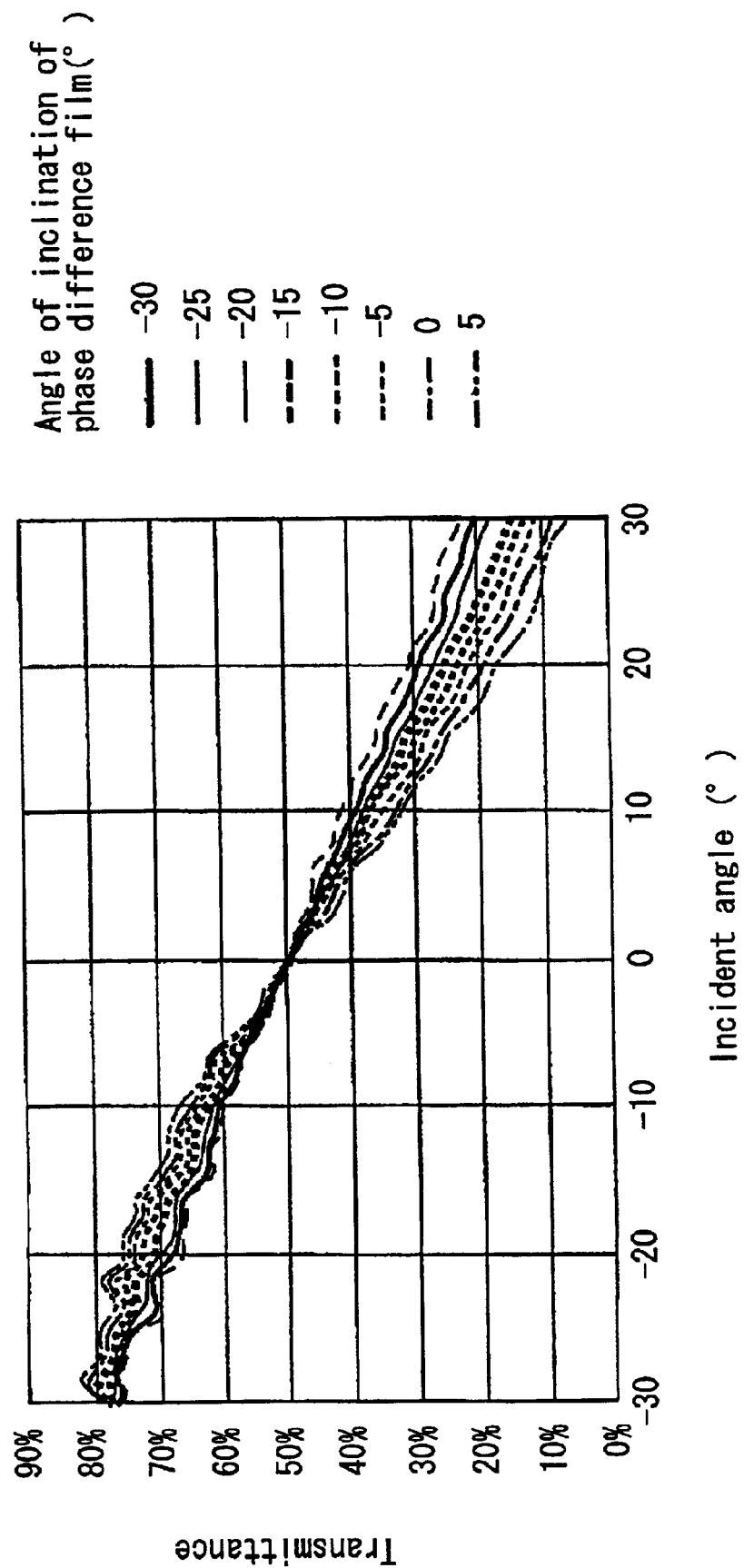
FIG. 16 is a graph of the result of simulation.

FIG. 16 shows the result of simulation of light exiting from the TN liquid crystal panel into the plane perpendicular to the panel surface and parallel to the polarization axis of the analyzer under conditions that the quarter-wave plate is used as the phase difference film and the applied voltage is set at a 50% level. When the applied voltage is set at the 50% level, the influence of the incident angle on the transmittance in the case where the quarter-wave plate has an angle of inclination of 20 degrees at which the contrast is most greatly improved (see FIG. 14) is less than the influence in the case where the quarter-wave plate has an angle of inclination of 0 degree.

Although not shown, the same result as the result shown in FIG. 16 is obtained when the applied voltage is set at the intermediate level except for the 50% level. The less influence of the incident angle on the transmittance at the intermediate level indicates that the deterioration in uniformity due to the properties of dependence on viewing angles is prevented even when the cell gap lengths vary according to the individual liquid crystal panels or when the cell gap lengths differ among a plurality of liquid crystal panels.

Figure 17:
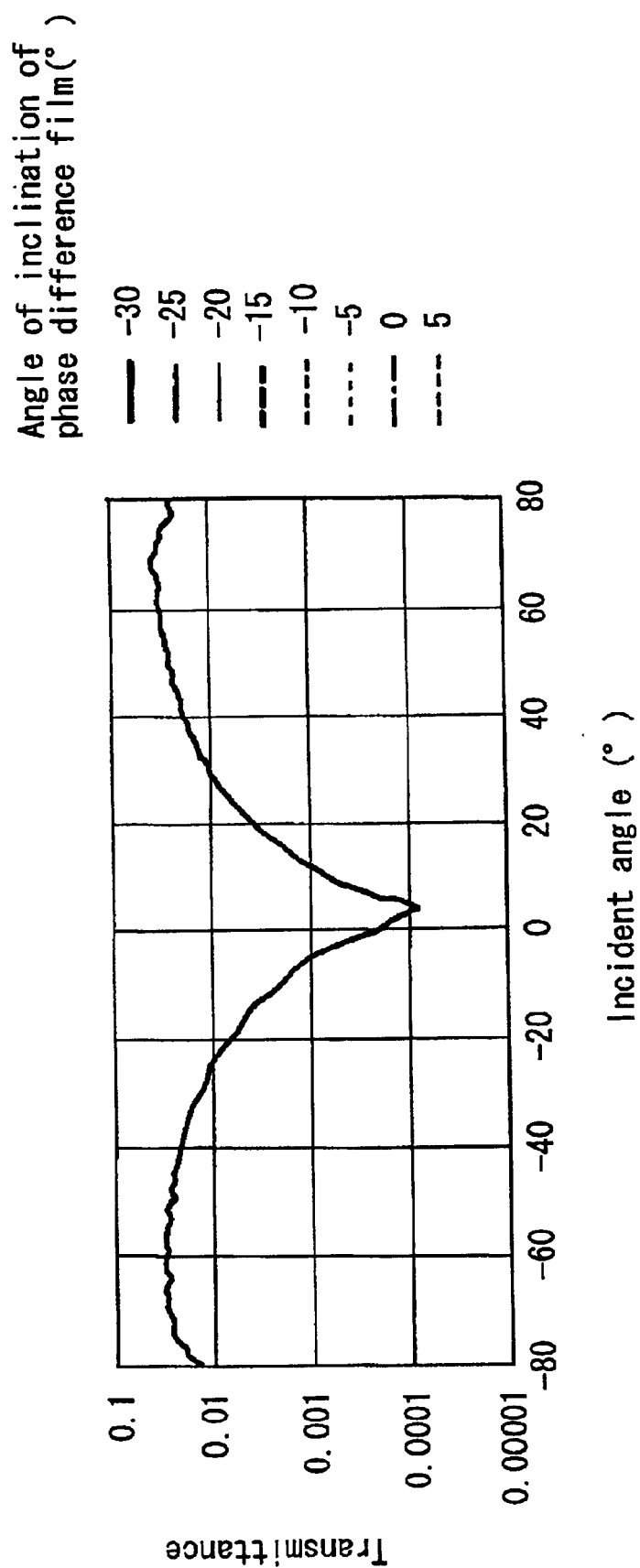
FIG. 17 is a graph of the result of simulation.
Figure 18:
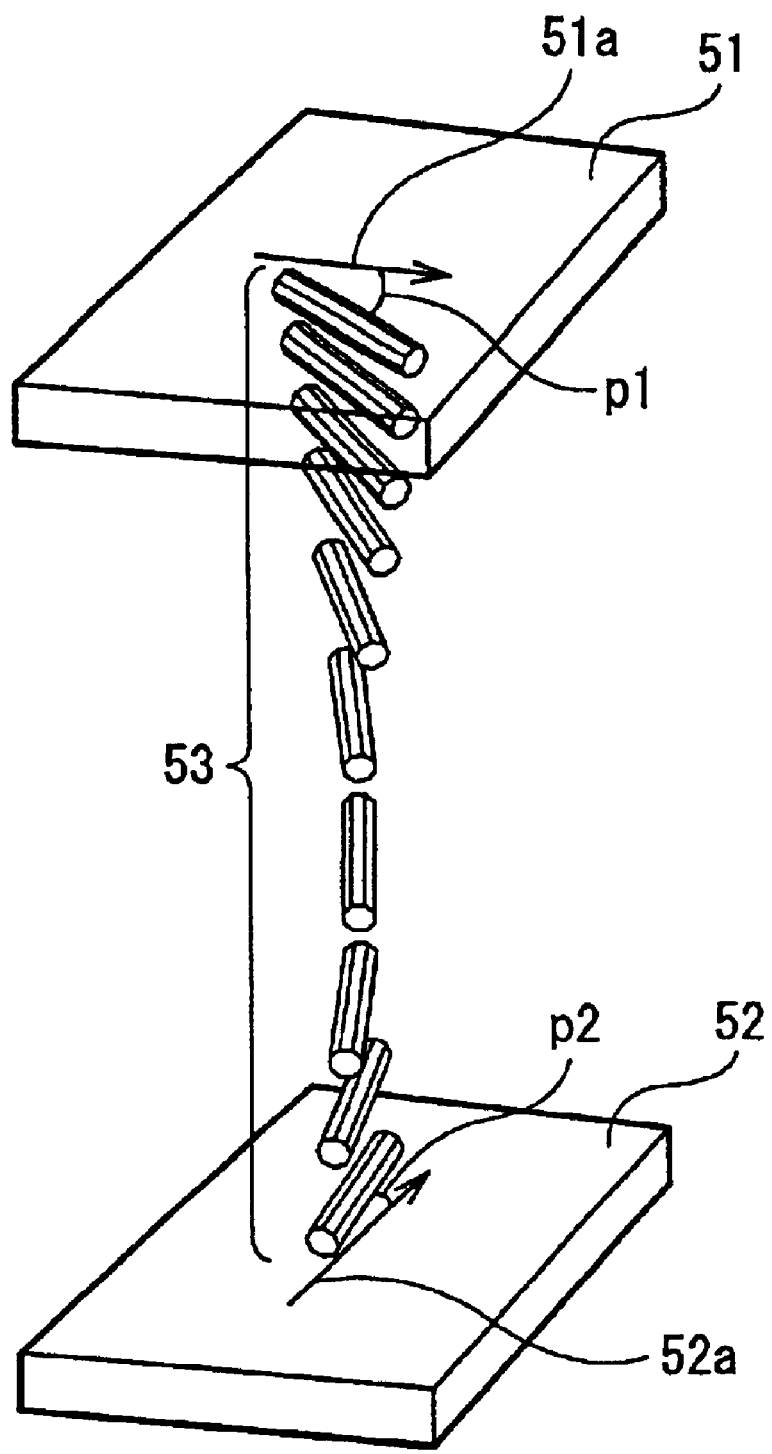
FIG. 18 shows pretilt angles of liquid crystal molecules.
Figure 19:
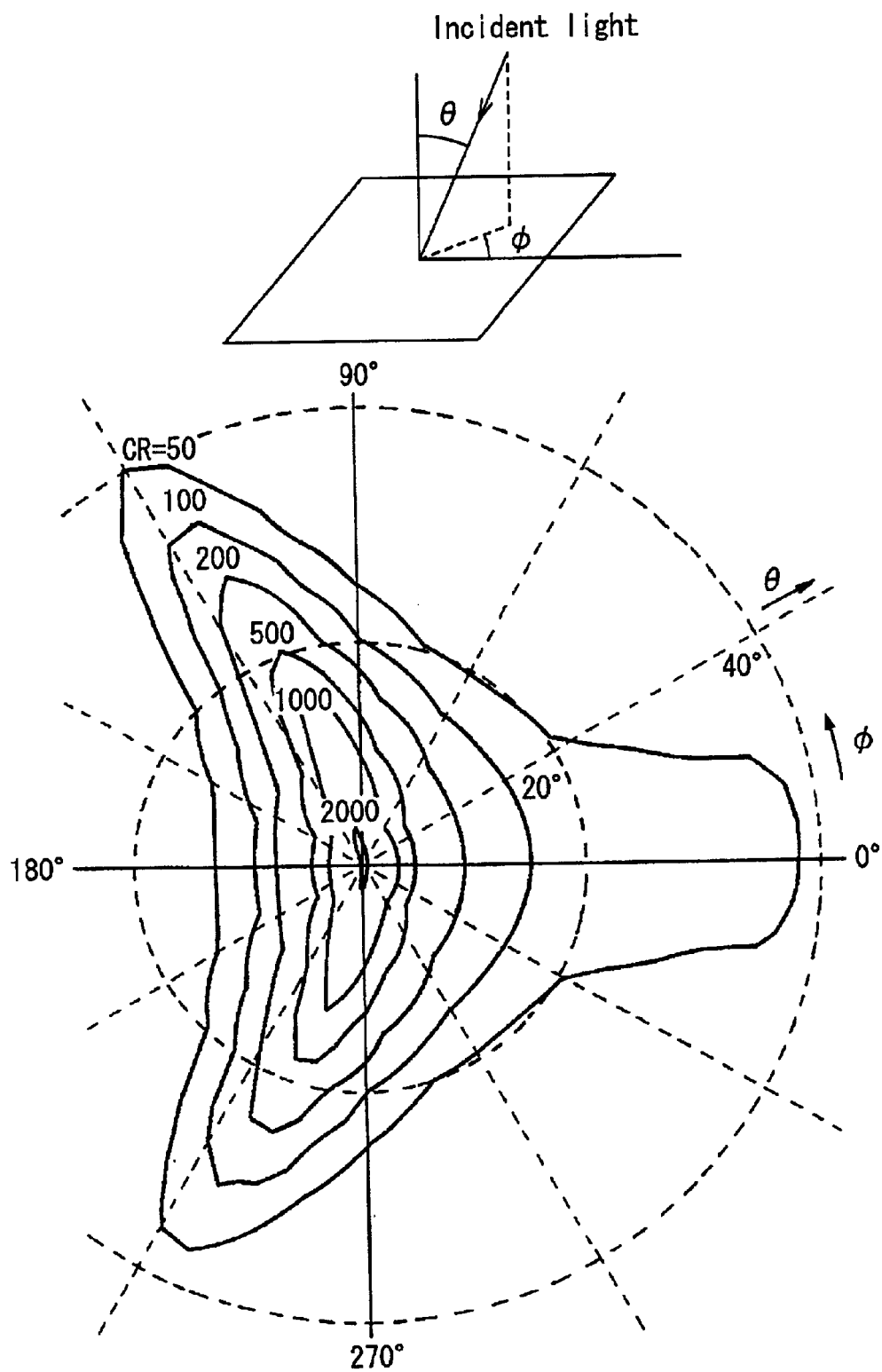
FIG. 19 shows the correlation between the incident angle of light to the liquid crystal panel and the degree of deterioration in contrast.

FIG. 17 shows the result of simulation of light exiting from the TN liquid crystal panel into a plane perpendicular to the panel surface and the polarization axis of the analyzer (i.e., a plane perpendicular to a plane which the light La, the light Lb and the light Lc shown in FIG. 9 pass through) under conditions that the quarter-wave plate is used as the phase difference film and the applied voltage is set at the level for displaying black. The transmittance of the light passing through the analyzer does not change even if the angle of inclination of the quarter-wave plate changes.

The light corresponds to resulting light in FIG. 8 after p-polarized light exits from the liquid crystal panel 42 after entering into the liquid crystal panel 42 through a plane (the z-x plane) perpendicular to the panel surface of the liquid crystal panel 42 and parallel to a polarization axis 41a of the polarizer 41. The direction of the polarization axis 41a matches the rubbing direction 43a of the alignment layer on the substrate 43 on the entry side of the liquid crystal panel 42. In the case of light entering obliquely into the liquid crystal panel 42, when the light passes through the liquid crystal molecules, phase shifts between extraordinary light and ordinary light are caused in the x-y plane and the z-x plane by the pretilt angle on the entry side (i.e., a tilt angle of the liquid crystal molecule 48 to the rubbing direction 43a), thereby changing the locus of a resultant electric field vector of the light and therefore changing the light into elliptically polarized light.

The fact that the transmittance of the light exiting into the plane perpendicular to the polarization axis of the analyzer does not change when the light passes through the analyzer indicates that the phase shifts due to the pretilt angle on the exit side can be independently compensated for without having any influence on the phase shifts due to the pretilt angle on the entry side. Conversely, when the phase delay axis of the phase difference film is perpendicular to the polarization axis of the polarizer rather than the analyzer (when the phase delay axis is perpendicular to the polarization axis 41a of the polarizer 41 in FIG. 8), the phase shifts due to the pretilt angle on the entry side can be compensated for independently of the phase shifts due to the pretilt angle on the exit side.

Even if an attempt is made to provide the viewing angle increasing film having retardation equivalent to the retardation of the phase difference film 5 having the angle α of inclination in the above-mentioned example, only the viewing angle increasing film whose retardation is not exactly equivalent to but slightly different from the retardation of the phase difference film 5 may be, in actual fact, available or manufactured.

Even if the viewing angle increasing film having exactly equivalent retardation can be provided, when the operation is performed in simulation as described above, the effect of improving the contrast and the uniformity may be slightly inferior to the result of simulation because of a subtle difference between a simulated optical model and an optical system of an actual liquid crystal projector apparatus.

After the viewing angle increasing film 4 is located between the liquid crystal panel 42 of each of the liquid crystal modules 1, 2 and 3 and the polarizer 47, it is preferable that, before fixing the viewing angle increasing film 4 to the liquid crystal panel 42 and the polarizer 47, the liquid crystal projector apparatus make fine adjustment of a rotational angle position of the viewing angle increasing film 4 in the plane parallel to the film surface (for example, the apparatus change the rotational angle position at an angle ranging between about 1 and 2 degrees), while projecting an image on the screen.

Fine adjustment is performed for the rotational angle position of the viewing angle increasing film 4 as described above, whereby fine adjustment can be performed for the magnitude of birefringence in the plane which the light La, the light Lb and the light Lc shown in FIG. 9 pass through, and therefore fine adjustment can be performed for the contrast and the uniformity of the image.

Then, the rotational angle position is determined so as to most greatly improve the contrast and the uniformity, and the viewing angle increasing film 4 can be fixed at the determined rotational angle position. Therefore, the effect of improving the contrast and the uniformity of the image can be most greatly enhanced for each of the individual liquid crystal projector apparatuses.

Although the phase delay axis 5a of the phase difference film 5 is perpendicular to the polarization axis 47a of the polarizer 47 in the above-described example, the phase advance axis of the phase difference film 5, not the phase delay axis 5a, may be perpendicular to the polarization axis 47a. Also in this case, the light Lb and the light Lc shown in FIG. 9 are phase shifted in opposite directions when passing through the phase difference film 5 (that is, the phase shifts occur in the direction opposite to the phase shifts that occur when the phase delay axis 5a is perpendicular to the polarization axis 47a), and therefore the phase shifts due to the pretilt angle on the exit side can be compensated for.

Although the phase delay axis 6a of the phase difference film 5 is perpendicular to the polarization axis 47a of the polarizer 47 in the above-described example, the phase delay axis 5a or the phase advance axis of the phase difference film 5 may be perpendicular to the polarization axis 41a of the polarizer 41, not the polarization axis 47a of the polarizer 47. Thus, the phase shifts due to the pretilt angle on the entry side can be compensated for, as described above.

The above-described method may be, of course, implemented when the phase delay axis 5a or the phase advance axis of the phase difference film 5 is perpendicular to the polarization axis 47a and when the phase delay axis 5a or the phase advance axis of the phase difference film 5 is perpendicular to the polarization axis 41a. This allows compensating for both the phase shifts due to the pretilt angle on the entry side and the phase shifts due to the pretilt angle on the exit side independently of each other and therefore allows still more greatly enhancing the effect of improving the contrast and the uniformity.

In the above-described example, the viewing angle increasing film 4 is located between the liquid crystal panel 42 and the polarizer 47. When there is little need for consideration of size reduction of the optical system, the liquid crystal projector apparatus may be, however, manufactured in a state in which a uniaxially oriented phase difference film having the determined angle α of inclination similarly to the phase difference film 5 is actually located between the liquid crystal panel 42 and the polarizer 47.

Figure 1:
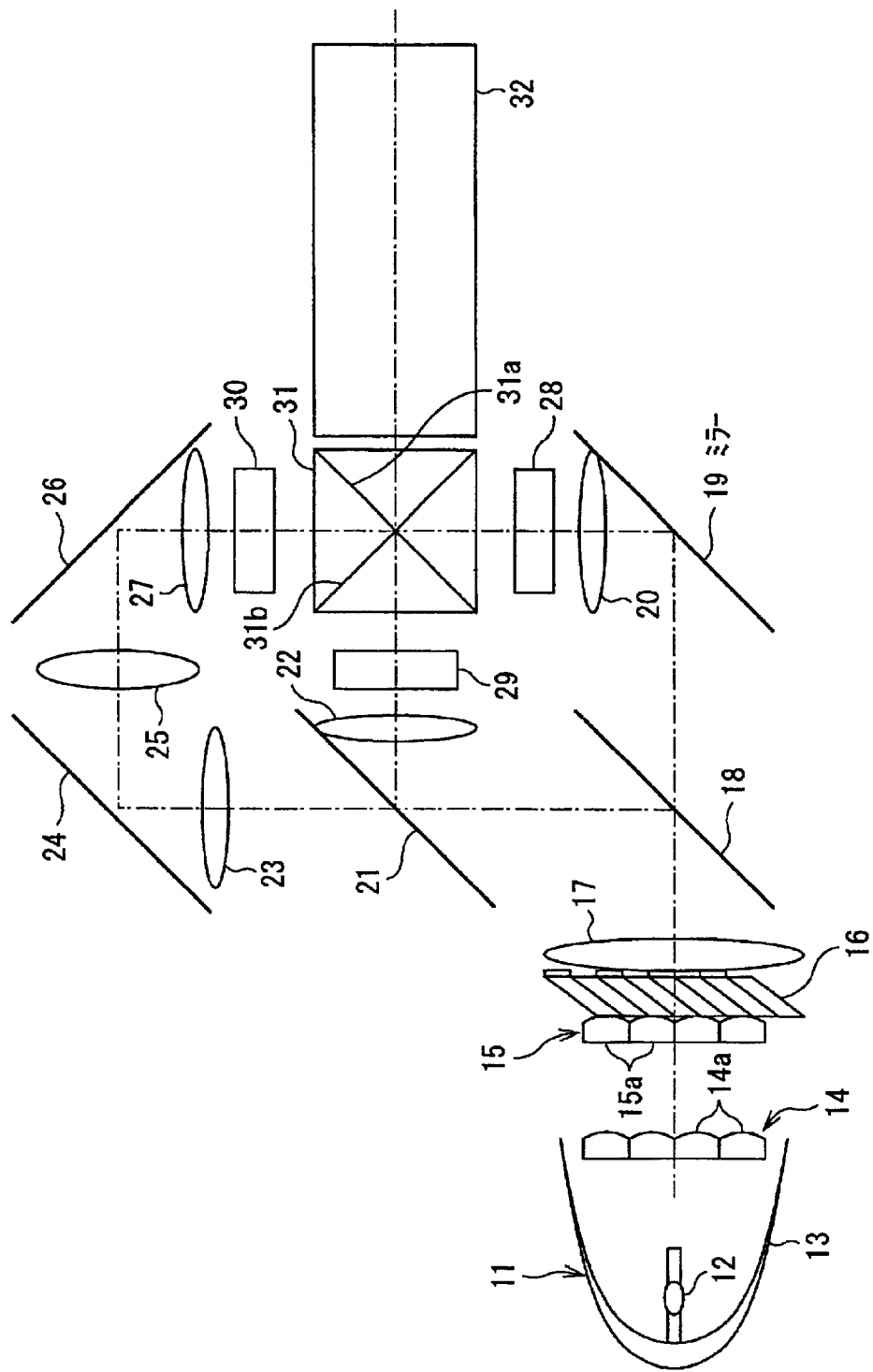
FIG. 1 shows an example of a configuration of an optical system of a three-panel transmission type liquid crystal projector apparatus of the related art.

The invention may be applied to any transmission type liquid crystal projector apparatus having liquid crystal panels each having microlenses for increasing a numerical aperture (e.g., a three-panel transmission type liquid crystal projector apparatus or a single-panel transmission type liquid crystal projector apparatus having a configuration other than the configuration shown in FIGS. 1 and 2).

The above-described method can prevent the deterioration in contrast and uniformity due to the properties of dependence on viewing angles, even if the method is applied to a transmission type liquid crystal projector apparatus having liquid crystal panels not having the microlenses for increasing the numerical aperture. As a method of improving the contrast and the uniformity, the above-described method may be therefore put to common use and implemented for both the transmission type liquid crystal projector apparatus having the liquid crystal panels each having the microlenses and the transmission type liquid crystal projector apparatus having the liquid crystal panels not having the microlenses.

As described above, according to the liquid crystal projector apparatus of the invention, the transmission type liquid crystal projector apparatus having the liquid crystal panels each having the microlenses for increasing the numerical aperture can optimally compensate for the phase shifts due to the pretilt angles according to the actual incident angle of light to the liquid crystal molecules, and therefore the apparatus can prevent the deterioration in contrast and uniformity due to the pretilt angles and can thus improve the contrast and the uniformity.

In normally white mode, when the uniaxially oriented phase difference film is located in such a manner that either the phase delay axis or the phase advance axis thereof is perpendicular to the polarization axis of the polarizer (or the analyzer) and that the film is inclined about the axis parallel to the polarization axis of the polarizer (or the analyzer), the phase shifts due to the pretilt angle on the entry side (or the exit side) can be compensated for independently of the phase shifts due to the pretilt angle on the exit side (or the entry side).

When both the uniaxially oriented phase difference film whose phase delay axis or phase advance axis is perpendicular to the polarization axis of the polarizer and the uniaxially oriented phase difference film whose phase delay axis or phase advance axis is perpendicular to the polarization axis of the analyzer are located, both the phase shifts due to the pretilt angle on the entry side and the phase shifts due to the pretilt angle on the exit side can be compensated for independently of each other, and therefore the contrast and the uniformity can be still more greatly improved.

When the viewing angle increasing film is provided, the film can minimize the increase in the distance between the liquid crystal panel and the analyzer and can therefore contribute to the downsized optical system of the liquid crystal projector apparatus.

According to the method of improving contrast of the invention, the transmission type liquid crystal projector apparatus having the liquid crystal panels each having the microlenses for increasing the numerical aperture can optimally compensate for the phase shifts due to the pretilt angles according to the actual incident angle of light to the liquid crystal molecules, and therefore the apparatus can prevent the deterioration in contrast and uniformity due to the pretilt angles and can thus improve the contrast and the uniformity.

The method can minimize the increase in the distance between the liquid crystal panel and the analyzer and can therefore contribute to the downsized optical system of the liquid crystal projector apparatus.

The method of improving contrast and uniformity can be put to common use for both the transmission type liquid crystal projector apparatus having the liquid crystal panels each having the microlenses and the transmission type liquid crystal projector apparatus having the liquid crystal panels not having the microlenses.

In normally white mode, when the uniaxially oriented phase difference film is located in such a manner that either the phase delay axis or the phase advance axis thereof is perpendicular to the polarization axis of the polarizer (or the analyzer) and that the film is inclined about the axis parallel to the polarization axis of the polarizer (or the analyzer), the phase shifts due to the pretilt angle on the entry side (or the exit side) can be compensated for independently of the phase shifts due to the pretilt angle on the exit side (or the entry side).

In the case where either the phase delay axis or the phase advance axis of the uniaxially oriented phase difference film is perpendicular to the polarization axis of the polarizer and where either the phase delay axis or the phase advance axis of the uniaxially oriented phase difference film is perpendicular to the polarization axis of the analyzer, when the second, third and fourth steps are performed, both the phase shifts due to the pretilt angle on the entry side and the phase shifts due to the pretilt angle on the exit side can be compensated for independently of each other, and therefore the contrast and the uniformity can be still more greatly improved.

When fine adjustment is performed for the rotational angle position of the viewing angle increasing film in the plane parallel to the film surface, the contrast and the uniformity can be improved even after the viewing angle increasing film is located.

[Comparison]

The description of second and third embodiments overlaps the above description, and the background art thereof will be described below.

Heretofore, there has been a projection type liquid crystal display apparatus (a liquid crystal projector) for displaying an image by projecting onto a screen light subjected to light modulation by a liquid crystal display device (hereinafter referred to as a liquid crystal panel). Types of image projection of the projection type liquid crystal display apparatus include a front projection type (a front type) for projecting an image from the front of a screen, and a rear projection type (a rear type) for projecting an image from the rear of a screen. Projection type liquid crystal display apparatuses for color display include a single-panel type using one liquid crystal panel, and a three-panel type using three liquid crystal panels for red (R) light, green (G) light and blue (B) light.

A TN (twisted nematic) type liquid crystal panel is often used in the projection type liquid crystal display apparatus. The TN type liquid crystal panel has a twisted nematic liquid crystal sealed in between two substrates. The nematic liquid crystal is composed of a plurality of rodlike molecules, which are aligned with their major axes oriented in the same direction. In general, the nematic liquid crystal has birefringence equivalent to birefringence of a positive uniaxial crystal. In this case, the directions of the optic axes of the liquid crystal molecules are the same as the directions of the major axes of the molecules. In the TN type liquid crystal panel, the nematic liquid crystal is sealed in between the two substrates in such a manner that the major axes of the molecules are aligned parallel to the two substrates and that the major axes of the molecules are twisted by 90 degrees as they are situated farther from one substrate and closer to the other substrate. When light enters into the above-mentioned TN type liquid crystal panel in a normal state in which no voltage is applied to the liquid crystal panel, optical rotatory power is generated by the twist of the liquid crystal, so that the direction of vibration of the light is rotated by 90 degrees along the twist of the liquid crystal. On the other hand, when a voltage is applied to the TN type liquid crystal panel, the liquid crystal molecules are realigned so that the major axes of the molecules may be perpendicular to the substrates, and thus the optical rotatory power is lost. Therefore, the incoming light in this state passes through the liquid crystal panel, while keeping the direction of vibration.

Figure 3:
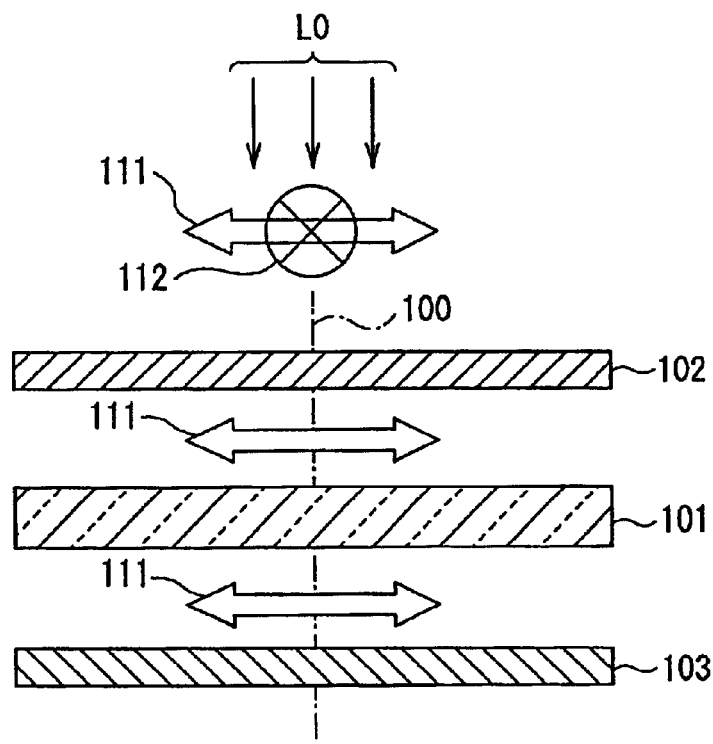
FIG. 3 is a cross sectional view of an example of a configuration of a peripheral portion of a liquid crystal panel of a general projection type liquid crystal display apparatus.

FIG. 3 shows an example of a configuration of a peripheral portion of a liquid crystal panel of a projection type liquid crystal display apparatus. In the example of the configuration, an entry-side polarizer 102 and an exit-side polarizer 103 are located on the light entry side and on the light exit side, respectively, with respect to a liquid crystal panel 101. The liquid crystal panel 101 is a transmission type liquid crystal panel using a TN liquid crystal, and has a twisted nematic liquid crystal sealed in between two substrates (not shown) within the liquid crystal panel 101. The entry-side polarizer 102 and the exit-side polarizer 103 are located in such a manner that the axes of light transmission thereof cross at right angles, that is, the so-called crossed Nicols holds. The axis of transmission of the entry-side polarizer 102 is set so as to be oriented in the same direction as the direction of alignment of liquid crystal molecules on a surface of an entry-side substrate of the liquid crystal panel 101. The axis of transmission of the exit-side polarizer 103 is set so as to be oriented in the same direction as the direction of alignment of liquid crystal molecules on a surface of an exit-side substrate of the liquid crystal panel 101.

In the above-described configuration, when emitted light L0 from a light source (not shown) enters into the entry-side polarizer 102, only linearly polarized light component 111 having the same direction of vibration as the direction of the axis of transmission of the entry-side polarizer 102 pass through the entry-side polarizer 102. Light components 112 having the direction of vibration perpendicular to the axis of transmission of the entry-side polarizer 102 are absorbed by the entry-side polarizer 102, so that the light components 112 do not pass through the entry-side polarizer 102. After passing through the entry-side polarizer 102, the light components 111 then enter into the liquid crystal panel 101.

In a normal state in which no voltage is applied to a liquid crystal layer in the liquid crystal panel 101, the optical rotatory power is generated by the twist of the liquid crystal, so that the direction of vibration of the light is rotated by 90 degrees along the twist of the liquid crystal. Thus, the direction of vibration of the light exiting from the liquid crystal panel 101 changes into the same direction as the direction of the axis of transmission of the exit-side polarizer 103, so that the light passes through the exit-side polarizer 103. After passing through the exit-side polarizer 103, the light is projected onto a screen through a projection optical system (not shown). At this time, the display status of an image is the so-called white-level display. On the other hand, in a conducting state in which a voltage is applied to the liquid crystal layer in the liquid crystal panel 101, the liquid crystal molecules are realigned so that the directions of the major axes of the liquid crystal molecules may be the same as the direction of an optical axis 100, and thus the optical rotatory power is lost. After passing through the entry-side polarizer 102, the linearly polarized light components 111 therefore exit from the liquid crystal panel 101 while keeping the direction of vibration, as shown in FIG. 3. The light exiting while keeping the direction of vibration is absorbed by the exit-side polarizer 103, so that the light does not pass through the exit-side polarizer 103. At this time, the display status of an image is the so-called black-level display. As described above, a display mode of performing the white-level display by allowing light to pass through the liquid crystal panel in the normal state in which no voltage is applied to the liquid crystal layer in the liquid crystal panel is generally called "normally white" mode.

Figure 4:
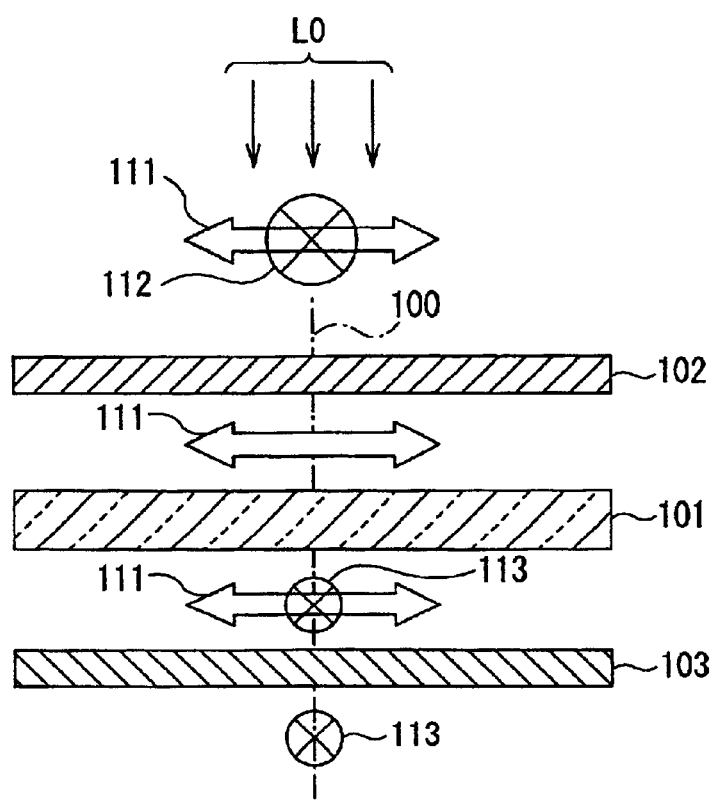
FIG. 4 is a cross sectional view for describing an optical problem of the general projection type liquid crystal display apparatus.

In the example of the configuration shown in FIG. 3, only the linearly polarized light components 111 having the direction of vibration perpendicular to the axis of transmission of the exit-side polarizer 103 must exit from the liquid crystal panel 101 in the conducting state in order to perform ideal black-level display. However, light components 113 having the direction of vibration perpendicular to the linearly polarized light components 111 are, in actual fact, generated in the conducting state because of properties of the liquid crystal panel 101 (see FIG. 4). Since the direction of vibration of the generated light components 113 is the same as the direction of the axis of transmission of the exit-side polarizer 103, the light components 113 pass through the exit-side polarizer 103 as they are. Although the light intensity of the light components 113 is lower than that of the light components 112 absorbed by the entry-side polarizer 102 and having the same direction of vibration, the light intensity of the light components 113 is likely to deteriorate the black-level display. The deterioration in the black-level display becomes a problem because it leads to the deterioration in contrast in image display. In FIG. 4, the relative light intensity of the light components 112 and 113 perpendicular to the linearly polarized light components 111 is schematically shown by the sizes of circular figures.

The brief description is now given with regard to the reason why undesired light components exit from the liquid crystal panel 101 even in the conducting state. The description is given below, assuming that the liquid crystal molecules have the same birefringence as the birefringence of the positive uniaxial crystal. In the conducting state, if the liquid crystal molecules are aligned so that the directions of the major axes of the liquid crystal molecules may be the same as the direction of the optical axis 100 over the overall liquid crystal layer, light entering parallel to the optical axis 100 can exit from the liquid crystal panel 101 while keeping the direction of vibration thereof. However, in the conducting state, the liquid crystal molecules are, in general, hardly aligned in the same direction as the direction of the optical axis 100 over the overall liquid crystal layer. The liquid crystal molecules near an entry-side interface of the liquid crystal layer, in particular, are insufficiently realigned even in the conducting state, so that the major axes of the molecules are inclined with respect to the optical axis 100. Therefore, the direction of vibration of light entering into the liquid crystal layer is changed due to the liquid crystal molecules near the interface, namely, the liquid crystal molecules in the light-entry-side and light-exit-side regions of the liquid crystal layer. Thus, when undesired light components are generated in the liquid crystal panel 101, linearly polarized light entering into the liquid crystal panel 101 changes into elliptically polarized light, which then exits from the liquid crystal panel 101.

In the field of the so-called direct-vision type liquid crystal display apparatus, there has been heretofore known a problem that, when the liquid crystal panel is viewed obliquely, the birefringence of the liquid crystal molecules causes change in transmission of light and thus deterioration in image quality. This problem is generally called dependence on viewing angles. In the field of the direct-vision type liquid crystal display apparatus, an optical compensator for improving the dependence on viewing angles has been recently developed. It is therefore possible that the optical compensator developed for the direct-vision type liquid crystal display apparatus is used in the projection type liquid crystal display apparatus so as to improve the contrast.

Figure 5:
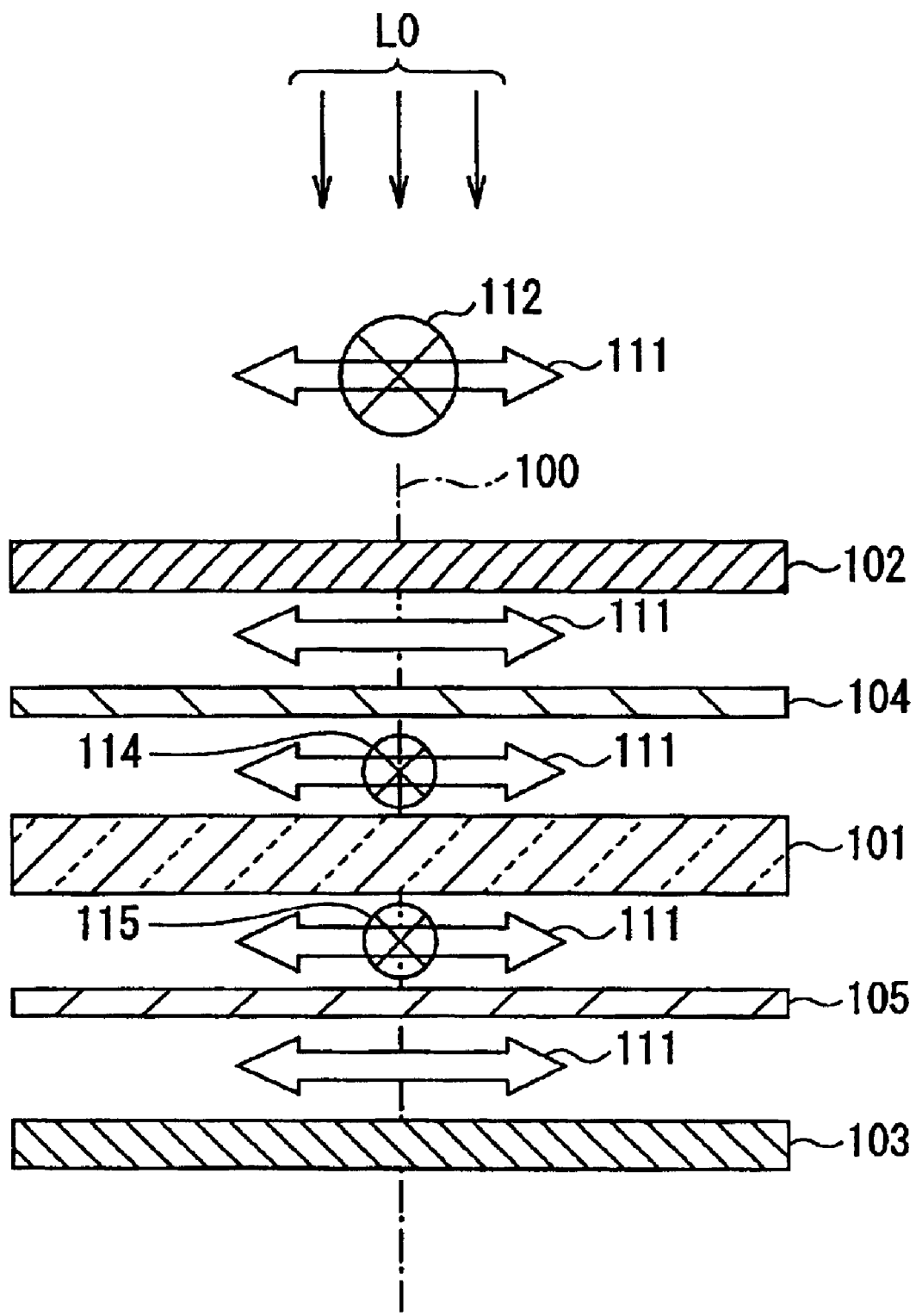
FIG. 5 is a cross sectional view for describing the case where an optical compensator for use in a direct-vision type liquid crystal display apparatus is applied to a projection type liquid crystal display apparatus.

FIG. 5 shows an example of a configuration of a projection type liquid crystal display apparatus to which the above-mentioned optical compensator is applied. In the example of the configuration shown in FIG. 5, the configuration is substantially the same as the configuration shown in FIG. 3 except that the configuration comprises optical compensators 104 and 105. As shown in FIG. 5, the optical compensator 104 is located between the entry-side polarizer 102 and the liquid crystal panel 101. The optical compensator 105 is located between the liquid crystal panel 101 and the exit-side polarizer 103. The optical compensator 104 functions to compensate for an optical phase difference caused by the liquid crystal molecules in the light-entry-side region of the liquid crystal layer. The optical compensator 105 functions to compensate for an optical phase difference caused by the liquid crystal molecules in the light-exit-side region of the liquid crystal layer.

In the above-mentioned configuration, when the linearly polarized light components 111 exiting from the entry-side polarizer 102 enter into the optical compensator 104, the function of the optical compensator 104 generates light components 114 having the direction of vibration perpendicular to the linearly polarized light components 111, as shown in FIG. 5. After exiting from the optical compensator 104, the light components 114 and the linearly polarized light components 111 then enter into the liquid crystal panel 101. When the liquid crystal panel 101 is conducting, the incoming light is first converted into only the linearly polarized light components 111 due to the birefringence of the liquid crystal molecules in the light-entry-side region of the liquid crystal layer. Thus, the optical compensator 104 eventually compensates for the optical phase difference caused by the liquid crystal molecules in the light-entry-side region of the liquid crystal layer.

When the light of the linearly polarized light components 111 further travels and passes through the light-exit-side region of the liquid crystal layer, light components 115 having the direction of vibration perpendicular to the linearly polarized light components 111 are again generated due to the birefringence of the liquid crystal molecules in the exit-side region. By the function of the optical compensator 105, the light of the light components 115 and the linearly polarized light components 111 exiting from the liquid crystal panel 101 is converted into only the linearly polarized light components 111, which then exit from the optical compensator 105, as shown in FIG. 5. Thus, the optical compensator 105 compensates for the optical phase difference caused by the liquid crystal molecules in the light-exit-side region of the liquid crystal layer. Therefore, it is only the linearly polarized light components 111 perpendicular to the axis of transmission of the exit-side polarizer 103 that exit from the optical compensator 105, and then the linearly polarized light components 111 are absorbed by the exit-side polarizer 103. In the above-described manner, the optical compensators 104 and 105 can prevent the deterioration in the black-level display and therefore improve the contrast.

Generally, when the optical compensator is used, ideal optical compensation can be performed if an entry angle of light entering into the optical compensator is set so as to be equal to an entry angle of light entering into a liquid crystal region to be compensated for. However, the liquid crystal panel for use in the projection type liquid crystal display apparatus often has microlenses in the light-entry-side region thereof in order to improve a vignetting factor and color purity. When another optical element is thus located between the optical compensator and the liquid crystal panel, a difference is made between the entry angle of light to the optical compensator and the entry angle of light entering into the liquid crystal region. In this state, the optical compensator performs insufficient optical compensation, which causes a problem of the deterioration in contrast.

[Second Embodiment]

The second and third embodiments of the invention will be described in detail below with reference to the drawings. In the second and third embodiments, since a nematic liquid crystal molecule generally has birefringence equivalent to birefringence of a positive crystal, a phase difference caused by the birefringence of the nematic liquid crystal molecule is compensated for by using a substance having properties optically opposite to the positive crystal, namely, a substance having birefringence equivalent to birefringence of a negative crystal.

Figure 20:
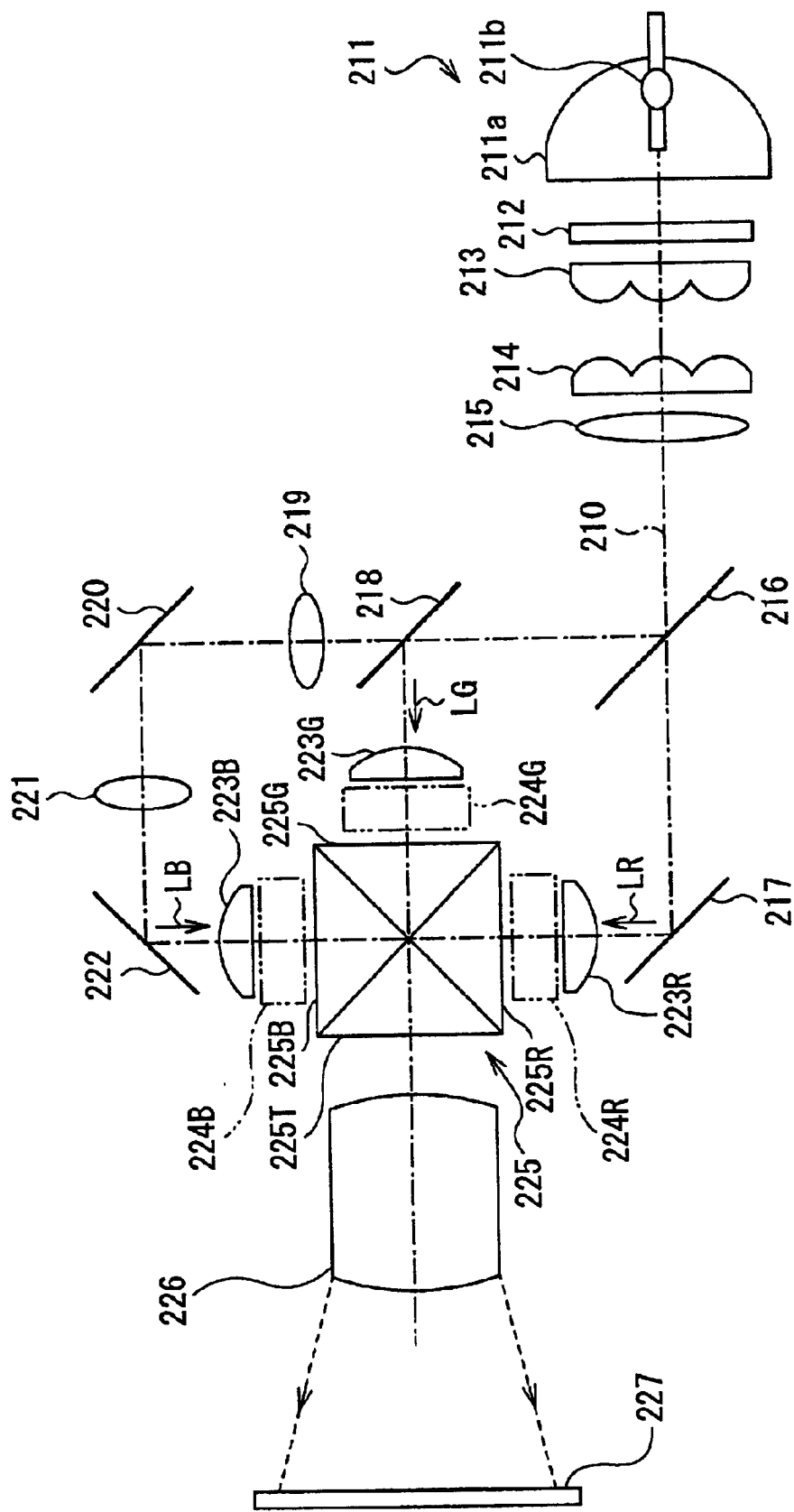
FIG. 20 shows the overall configuration of a projection type liquid crystal display apparatus according to a second embodiment of the invention.

FIG. 20 shows the overall configuration of a projection type liquid crystal display apparatus according to the second embodiment of the invention. The projection type liquid crystal display apparatus shown in FIG. 20 is a three-panel type for performing color image display using three transmission type liquid crystal panels. The projection type liquid crystal display apparatus comprises a light source 211, a UV (ultraviolet)/IR (infrared) cut filter 212, a fly-eye lenses 213 and 214, a condenser lens 215, and a dichroic mirror 216, which are arranged in sequence along an optical axis 210.

The light source 211 is adapted to emit white light containing red light, blue light and green light required for the color image display. The light source 211 includes an illuminant 211a for emitting white light, and a concave mirror 211b for reflecting and focusing the light emitted from the illuminant 211a. For example, a halogen lamp, a metal halide lamp, a xenon lamp or the like is used as the illuminant 211a. Desirably, the concave mirror 211b is shaped to have high focusing efficiency, and, for example, the concave mirror 211b is symmetrical about the axis of rotation, like a rotary ellipsoidal mirror, a rotary parabolic mirror or the like.

The UV/IR cut filter 212 functions to eliminate light in the ultraviolet and infrared regions contained in the white light emitted from the light source 211. The fly-eye lenses 213 and 214 function to diffuse the light after passing through the UV/IR cut filter 212 and thereby make the distribution of illuminance of the light uniform. The dichroic mirror 216 functions to divide the light, which impinges on the dichroic mirror 216 after passing through the UV/IR cut filter 212, the fly-eye lenses 213 and 214 and the condenser lens 215, into red light LR and the other color light.

The projection type liquid crystal display apparatus also comprises a total reflection mirror 217, a condenser lens 223R, and a liquid crystal panel portion 224R, which are arranged in sequence along an optical path of the red light LR into which the dichroic mirror 216 divides the incident light. The total reflection mirror 217 is adapted to reflect the red light LR, which the dichroic mirror 216 divides the incident light into, toward the liquid crystal panel portion 224R. The condenser lens 223R is adapted to focus the red light LR reflected by the dichroic mirror 216 on the liquid crystal panel portion 224R. The liquid crystal panel portion 224R functions to spatially modulate the red light LR entering into the liquid crystal panel portion 224R via the total reflection mirror 217 and the condenser lens 223R, in response to an image signal.

The projection type liquid crystal display apparatus further comprises a dichroic mirror 218 along an optical path of the other color light into which the dichroic mirror 216 divides the incident light. The dichroic mirror 218 functions to divide the light incident on the dichroic mirror 218 into green light and blue light.

The projection type liquid crystal display apparatus also comprises a condenser lens 223G and a liquid crystal panel portion 224G, which are arranged in sequence along an optical path of green light LG into which the dichroic mirror 218 divides the incident light. The condenser lens 223G is adapted to focus the green light LG, which the dichroic mirror 218 divides the incident light into, on the liquid crystal panel portion 224G. The liquid crystal panel portion 224G functions to spatially modulate the green light LG entering into the liquid crystal panel portion 224G after passing through the condenser lens 223G, in response to an image signal.

The projection type liquid crystal display apparatus further comprises a relay lens 219, a total reflection mirror 220, a relay lens 221, a total reflection mirror 222, a condenser lens 223B, and a liquid crystal panel portion 224B, which are arranged in sequence along an optical path of blue light LB into which the dichroic mirror 218 divides the incident light. The total reflection mirror 220 is adapted to reflect the blue light LB, which the dichroic mirror 218 divides the incident light into and which then impinges on the total reflection mirror 220 after passing through the relay lens 219, toward the total reflection mirror 222. The total reflection mirror 222 is adapted to reflect the blue light LB, which is reflected by the total reflection mirror 220 and then impinges on the total reflection mirror 222 after passing through the relay lens 221, toward the liquid crystal panel portion 224B. The liquid crystal panel portion 224B functions to spatially modulate the blue light LB, which is reflected by the total reflection mirror 222 and then enters into the liquid crystal panel portion 224B after passing through the condenser lens 223B, in response to an image signal.

The projection type liquid crystal display apparatus also comprises a dichroic prism 225 for combining the red light LR, the green light LG and the blue light LB, which is located at a position where the optical paths of the red light LR, the green light LG and the blue light LB cross one another. The projection type liquid crystal display apparatus also comprises a projection lens 226 for projecting combined light exiting from the dichroic prism 225 onto a screen 227. The dichroic prism 225 has three entry surfaces 225R, 225G and 225B, and one exit surface 225T. The red light LR exiting from the liquid crystal panel portion 224R enters into the dichroic prism 225 through the entry surface 225R. The green light LG exiting from the liquid crystal panel portion 224G enters into the dichroic prism 225 through the entry surface 225G. The blue light LB exiting from the liquid crystal panel portion 224B enters into the dichroic prism 225 through the entry surface 225B. The dichroic prism 225 combines the red light LR, the green light LG and the blue light LB entering into the dichroic prism 225 through the entry surfaces 225R, 225G and 225B into combined light, which then exits from the dichroic prism 225 through the exit surface 225T.

Figure 21:
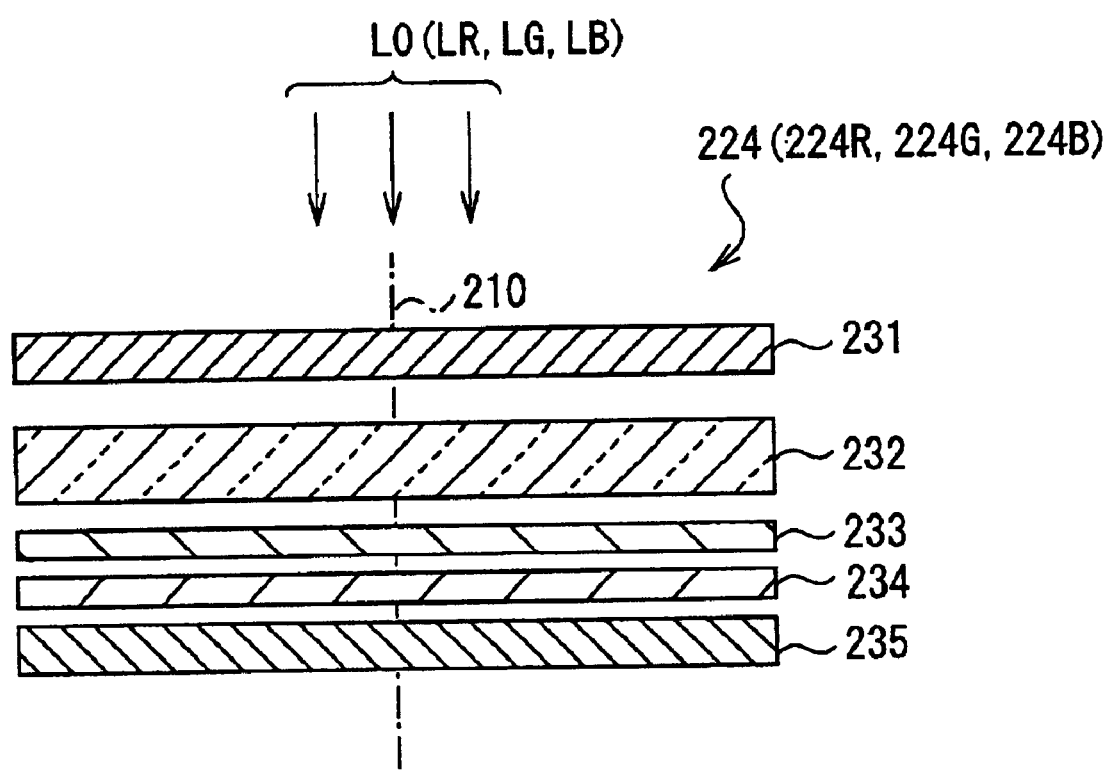
FIG. 21 is a cross sectional view of a general configuration of each of liquid crystal panel portions of the projection type liquid crystal display apparatus shown in FIG. 20.

FIG. 21 shows a configuration of a principal part of each of the liquid crystal panel portions. The liquid crystal panel portions 224R, 224G and 224B have substantially the same function and configuration, except that the panel portions 224R, 224G and 224B differ only in light component to be modulated. The configurations of the panel portions for three colors will be collectively described below. As shown in FIG. 21, the liquid crystal panel portion 224 (224R, 224G and 224B) has an entry-side polarizer 231, a liquid crystal panel 232, optical compensators 233 and 234, and an exit-side polarizer 235, which are arranged in sequence when viewed from the light entry side. Light entry and exit surfaces of each optical element of the liquid crystal panel portion 224 are perpendicular to the optical axis 210. The liquid crystal panel 232 is a transmission type liquid crystal panel using a TN liquid crystal and has a twisted nematic liquid crystal sealed therein. The entry-side polarizer 231 and the exit-side polarizer 235 are adapted to transmit only linearly polarized light of incoming light having a predetermined direction of vibration (oscillating in a predetermined plane of polarization). The optical compensator 233 functions to compensate for an optical phase difference caused by liquid crystal molecules in a light-exit-side region of a liquid crystal layer in the liquid crystal panel 232. The optical compensator 234 functions to compensate for an optical phase difference caused by liquid crystal molecules in a light-entry-side region of the liquid crystal layer in the liquid crystal panel 232.

The liquid crystal panel 232 corresponds to a specific example of "a liquid crystal display device" of the invention. The optical compensator 234 corresponds to a specific example of "a first optical compensator" of the invention, and the optical compensator 233 corresponds to a specific example of "a second optical compensator" of the invention. The position of the optical compensator 234 is not limited to the position shown in FIG. 21, and the optical compensator 234 can be located at any position so long as the optical compensator 234 is located between the liquid crystal panel 232 and the exit-side polarizer 235. That is, the optical compensator 234 may be located between the liquid crystal panel 232 and the optical compensator 233. Although the optical compensators 233 and 234 are spaced in FIG. 21, the optical compensators 233 and 234 may be in close contact with each other. Alternatively, the optical compensators 233 and 234 may be in close contact with the other optical elements. For example, the optical compensator 233 may be in close contact with the liquid crystal panel 232.

Figure 22:
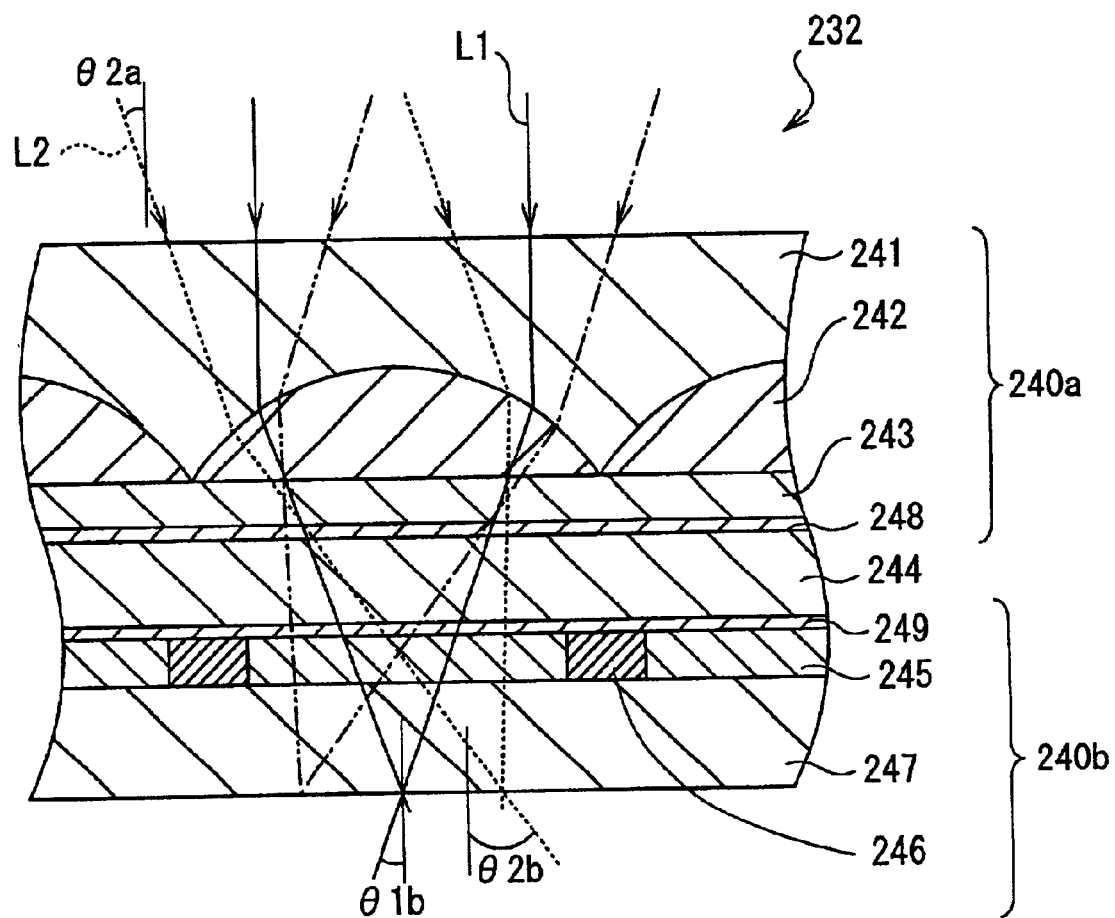
FIG. 22 is a cross sectional view of a detailed configuration of the liquid crystal panel shown in FIG. 21.

FIG. 22 shows a detailed configuration of the liquid crystal panel 232. The liquid crystal panel 232 comprises a pixel electrode substrate 240b, and a facing substrate 240a which is located on a liquid crystal layer 244 on the side close to a light entry surface of the pixel electrode substrate 240b and is faced with the pixel electrode substrate 240b with the liquid crystal layer 244 in between.

The pixel electrode substrate 240b has a glass substrate 247, and a plurality of pixel electrode portions 245 and a plurality of black matrix portions 246 which are stacked on a light entry surface of the glass substrate 247. The pixel electrode substrate 240b also has an alignment layer 249 stacked between the pixel electrode portions 245 and black matrix portions 246 and the liquid crystal layer 244. Each pixel electrode portion 245 is made of a conductive transparent member. Each black matrix portion 246 is formed between the pixel electrode portions 245. Each black matrix portion 246 is shielded from light by a metal film or the like, for example. Inside each black matrix portion 246, a switching device (not shown) for selectively applying a voltage to the pixel electrode portions 245 adjacent to the black matrix portion 246 in response to an image signal is formed. For example, a thin film transistor (TFT) is used as the switching device for applying a voltage to the pixel electrode portions 245.

A surface of the alignment layer 249 in contact with the liquid crystal layer 244 is subjected to rubbing in order that liquid crystal molecules in a light-exit-side region of the liquid crystal layer 244 (near an interface between the liquid crystal layer 244 and the alignment layer 249) may be oriented in the same direction. Rubbing is generally accomplished by rubbing the surface of the alignment layer 249 by means of a cloth-wound roller. The alignment layer 249 is subjected to rubbing, whereby a plurality of grooves are cut in the same direction in the surface of the alignment layer 249. The liquid crystal molecules in the region in contact with the alignment layer 249 are oriented in the same direction along the grooves cut in the surface of the alignment layer 249. The direction of the grooves cut through rubbing is hereinafter referred to as "a rubbing direction".

The facing substrate 240a has a glass substrate 241, microlenses 242, a facing electrode 243, and an alignment layer 248, which are arranged in sequence when viewed from the light entry side. The alignment layer 248 is located in such a manner that the light-exit-side surface thereof is in contact with the liquid crystal layer 244. The surface of the alignment layer 248 in contact with the liquid crystal layer 244 is subjected to rubbing through the same approach as an approach for rubbing the alignment layer 249 of the pixel electrode substrate 240b, in order that liquid crystal molecules in a light-entry-side region of the liquid crystal layer 244 (near an interface between the liquid crystal layer 244 and the alignment layer 248) may be oriented in the same direction.

The facing electrode 243 is stacked on a light-entry-side surface of the alignment layer 248. The facing electrode 243 is an electrode for generating an electric potential between the facing electrode 243 and the pixel electrode portions 245, and is made of a transparent conductive film such as ITO (Indium Tin Oxide). The facing electrode 243 is generally fixed at a fixed potential (e.g., a ground potential). The microlenses 242 are stacked on a light-entry-side surface of the facing electrode 243. A plurality of microlenses 242 are provided to correspond to the pixel electrode portions 245.

Each microlens 242 is convex in shape on the light entry side thereof and is flat in shape on the light exit side thereof. Each microlens 242 has positive refracting power so as to focus light, which enters into the microlens 242 after passing through the glass substrate 241, on the corresponding pixel electrode portion 245. For example, light L1 entering into each microlens 242 perpendicularly to an entry surface of the liquid crystal panel 232 (that is, parallel to the optical axis 210), except for its light components passing through an optical axis of each microlens 242, is allowed to enter into the liquid crystal layer 244 at an entry angle $\theta 1b$ to the optical axis 210 by the action of each microlens 242. Light L2 entering into each microlens 242 at an angle to the entry surface of the liquid crystal panel 232 (that is, at an angle θ2a to the optical axis 210) is allowed to enter into the liquid crystal layer 244 at a different angle θ2b from the angle θ2a by the action of each microlens 242. The microlenses 242 are provided, so that the efficiency of entry of light into the pixel electrode portions 245 can be improved.

Figure 23:
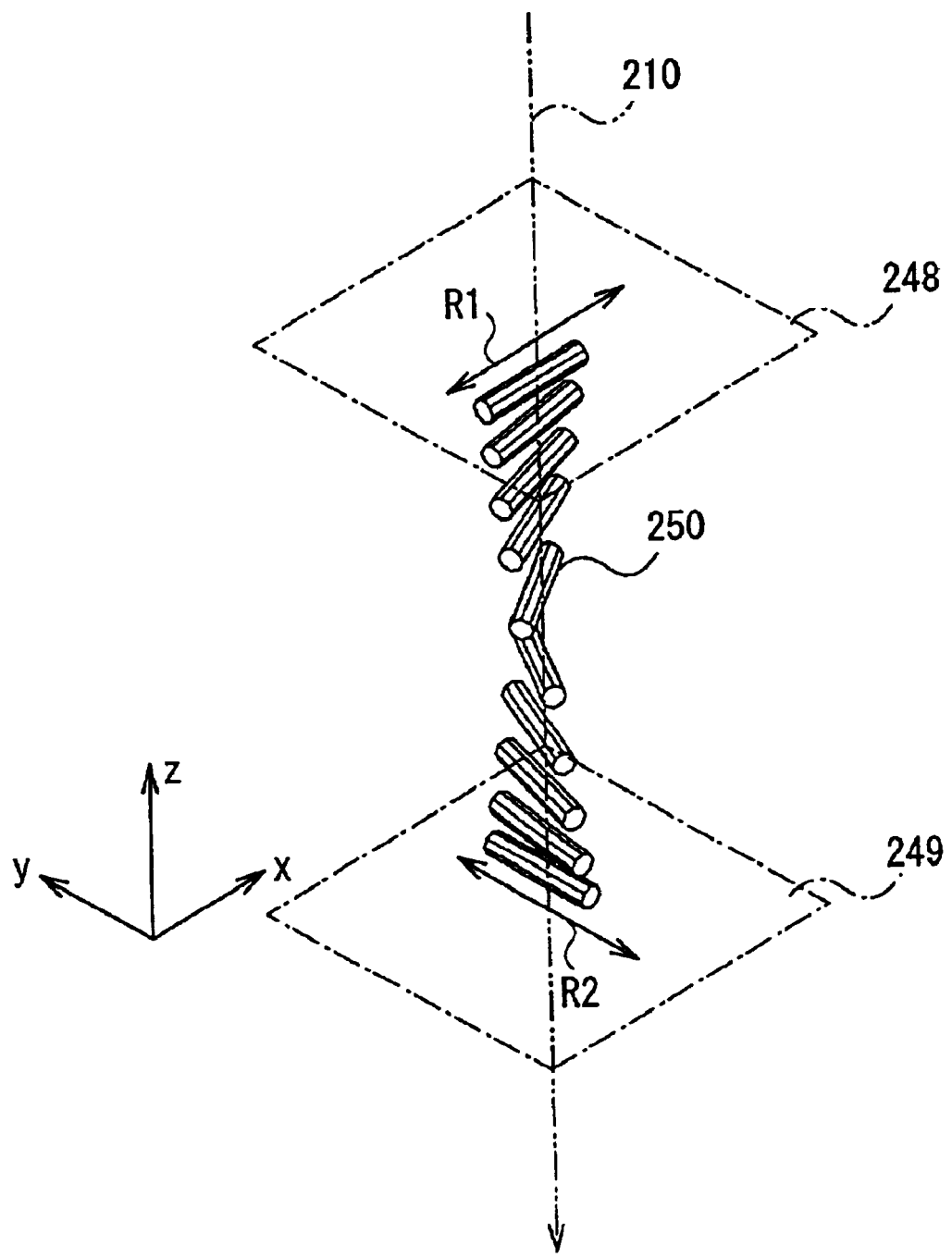
FIG. 23 illustrates the alignment of liquid crystal molecules in a state in which no voltage is applied to a liquid crystal layer shown in FIG. 22.

FIG. 23 shows the alignment of liquid crystal molecules in a normal state in which no voltage is applied to the liquid crystal layer. In FIG. 23, a straight line parallel to the optical axis 210 is assumed to be the z-axis, and two straight lines in a plane perpendicular to the z-axis are assumed to be the x-axis and the y-axis. Light entry and exit surfaces of the liquid crystal layer 244 are parallel to the x-y plane. A nematic liquid crystal composed of a plurality of rodlike liquid crystal molecules 250 is sealed in the liquid crystal layer 244. The liquid crystal molecules 250 are aligned so that the major axes of the molecules are perpendicular to the optical axis 210. That is, the major axes of the liquid crystal molecules 250 are aligned parallel to the light entry and exit surfaces. A rubbing direction R1 of the alignment layer 248 and a rubbing direction R2 of the alignment layer 249 are set so as to cross at right angles. In an example shown in FIG. 23, the rubbing direction R1 of the alignment layer 248 is assumed to be the x-axis direction, and the rubbing direction R2 of the alignment layer 249 is assumed to be the y-axis direction.

In the liquid crystal layer 244, the liquid crystal molecules near the interface between the liquid crystal layer 244 and the alignment layer 248 are aligned in the same direction as the rubbing direction R1 of the alignment layer 248 by the action of rubbing applied to the surface of the alignment layer 248. Similarly, the liquid crystal molecules near the interface between the liquid crystal layer 244 and the alignment layer 249 are aligned in substantially the same direction as the rubbing direction R2 of the alignment layer 249. Since the rubbing directions R1 and R2 cross at right angles, the liquid crystal molecules 250 are aligned so that the major axes of the molecules are twisted by 90 degrees as they are situated farther from the alignment layer 248 and closer to the alignment layer 249, that is, farther from the light entry side and closer to the light exit side. The nematic liquid crystal having the alignment of twisted liquid crystal molecules as mentioned above is called a TN liquid crystal. When light enters into the TN liquid crystal in the normal state in which no voltage is applied to the TN liquid crystal, the optical rotatory power is generated by the twist of the liquid crystal, so that the direction of vibration of the light is rotated by 90 degrees along the direction of the twist of the liquid crystal.

Figure 24:
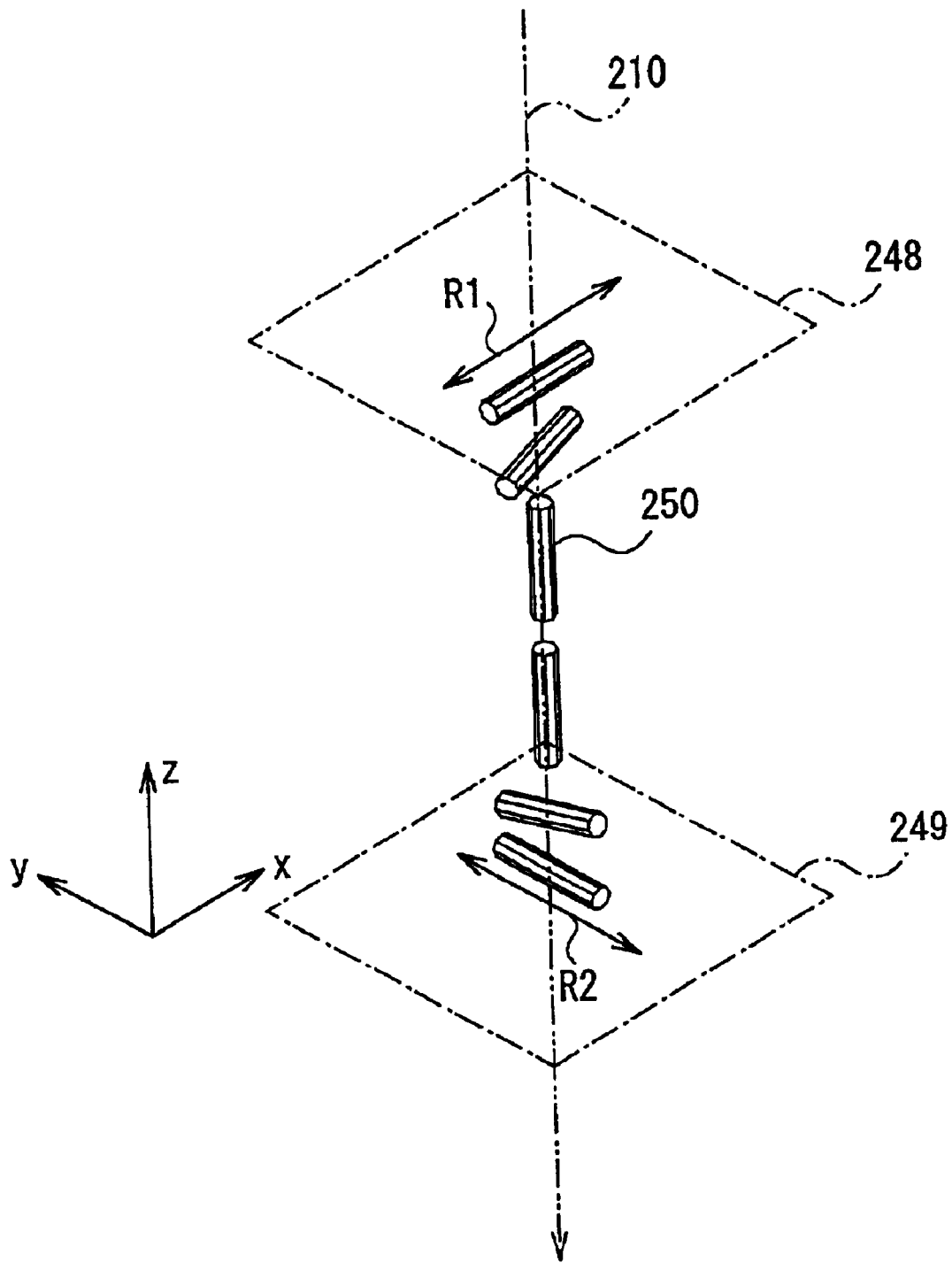
FIG. 24 illustrates the alignment of liquid crystal molecules in a state in which a voltage is applied to the liquid crystal layer shown in FIG. 22.

FIG. 24 shows the alignment of liquid crystal molecules in a state in which a voltage is applied to the liquid crystal layer. When a voltage is applied to the liquid crystal layer 244, the liquid crystal molecules 250 are realigned so that the liquid crystal molecules 250 may be upright, that is, the major axes of the molecules may be parallel to the optical axis 210 (that is, perpendicular to a plane of incidence of light).

Ideally, it is desirable that, in the voltage-applied state, all the liquid crystal molecules 250 in the liquid crystal layer 244 be realigned so as to be parallel to the optical axis 210. This alignment allows light entering into the liquid crystal layer 244 in parallel with the optical axis 210 to pass through the liquid crystal layer 244 while keeping the direction of vibration thereof. However, in the conducting state, the liquid crystal molecules 250 are, in actual fact, realigned so that the major axes of the molecules gradually become upright as they are situated farther from the alignment layers 248 and 249 and closer to a central region of the liquid crystal layer 244. Even in the conducting state, the liquid crystal molecules 250 near the interfaces between the liquid crystal layer 244 and the alignment layers 248 and 249 are therefore aligned with the major axes thereof not parallel but inclined to the optical axis 210. Because of the existence of the liquid crystal molecules 250 inclined to the optical axis 210 as mentioned above, when linearly polarized light enters into the liquid crystal layer 244 in parallel with the optical axis 210 in the conducting state, the light causes a phase difference near the interfaces due to birefringence of the liquid crystal molecules 250 and thus changes into elliptically polarized light, which then exits from the liquid crystal layer 244. In the embodiment, the optical compensators 233 and 234 (see FIG. 21) make optical compensation for the phase difference caused near the interfaces between the liquid crystal layer 244 and the alignment layers 248 and 249.

Next, the structure and function of each of the optical compensators 233 and 234 will be described in detail. In general, a nematic liquid crystal molecule has birefringence equivalent to birefringence of a positive crystal. Therefore, a phase difference caused by the birefringence of the nematic liquid crystal molecule can be compensated for by using a substance having properties optically opposite to the positive crystal, i.e., a substance having birefringence equivalent to birefringence of a negative crystal. The description is given below, assuming that the liquid crystal layer 244 is composed of liquid crystal molecules each having birefringence equivalent to birefringence of a positive uniaxial crystal and the optical compensators 233 and 234 are each composed of a substance having birefringence equivalent to birefringence of a negative uniaxial crystal.

Figure 28:
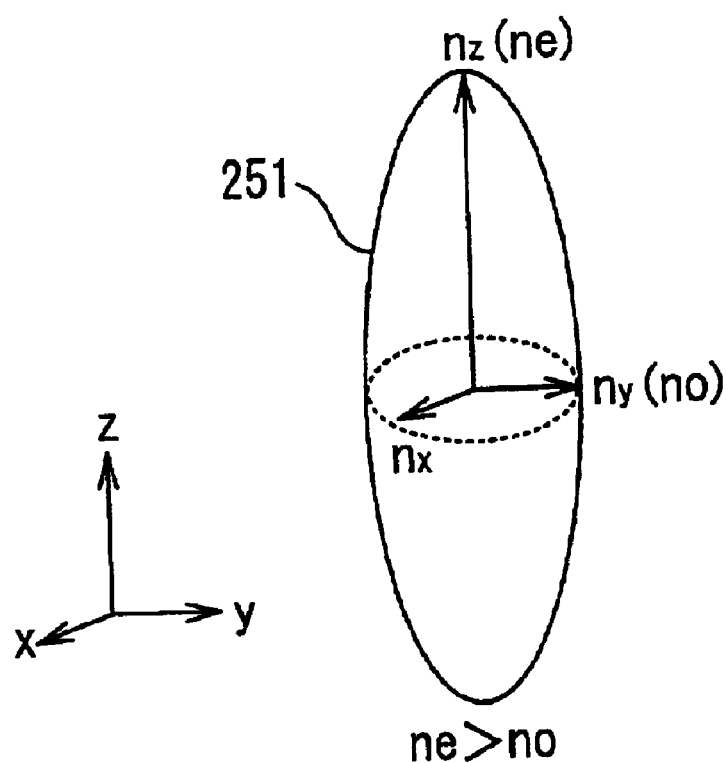
FIG. 28 illustrates optical properties of a positive uniaxial crystal.
Figure 29:
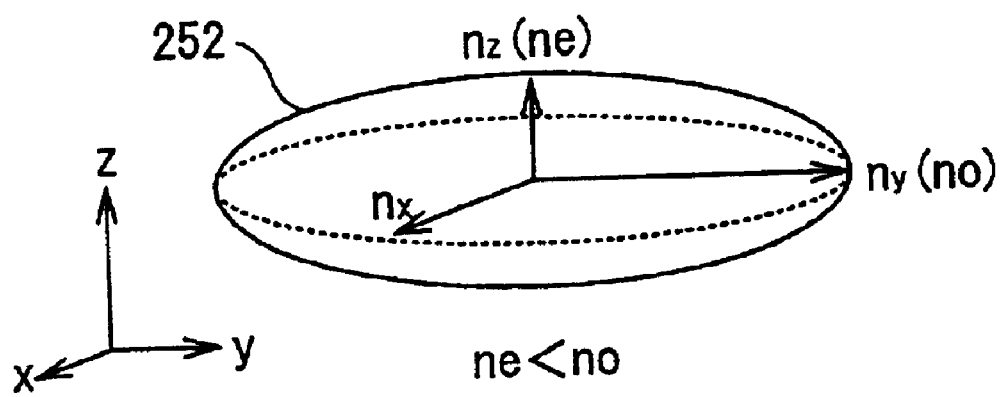
FIG. 29 illustrates optical properties of a negative uniaxial crystal.

FIG. 28 shows a refractive index profile of a positive uniaxial crystal, and FIG. 29 shows a refractive index profile of a negative uniaxial crystal. In FIGS. 28 and 29, the refractive indices in the x-axis, y-axis and z-axis directions crossing at right angles are indicated by 'nx', 'ny' and 'nz', respectively. In FIGS. 28 and 29, the z-axis direction is assumed to be the direction of an optic axis of the crystal. The refractive index profile of the uniaxial crystal is shown by a shape of a rotary ellipsoid rotated about the optic axis. The rotary ellipsoid showing the refractive index profile is generally called an index ellipsoid. As can be seen from the shape of the index ellipsoid, the uniaxial crystal has the refractive indices nx and ny in the x-axis and y-axis directions whose values are equal (hereinafter referred to as 'no'). Light entering into the uniaxial crystal in the direction of the optic axis does not exhibit birefringence, and light entering into the uniaxial crystal in any direction other than the direction of the optic axis exhibits birefringence. When a value of the refractive index nz in the z-axis direction is assumed to be 'ne', "ne>no" is satisfied in a positive uniaxial crystal 251 (see FIG. 28) and "ne<no" is satisfied in a negative uniaxial crystal 252 (see FIG. 29). Therefore, the index ellipsoid of the negative uniaxial crystal 252 is disc-shaped. Because of the above-described optical properties, a combination of positive and negative uniaxial crystals each having an appropriate refractive index profile permits eliminating the birefringence of incoming light. For example, the positive uniaxial crystal and the negative uniaxial crystal are appropriately aligned so that the directions of the optic axes thereof may be the same as each other, whereby the birefringence of incoming light from any direction can be canceled and thus eliminated.

Figure 26:
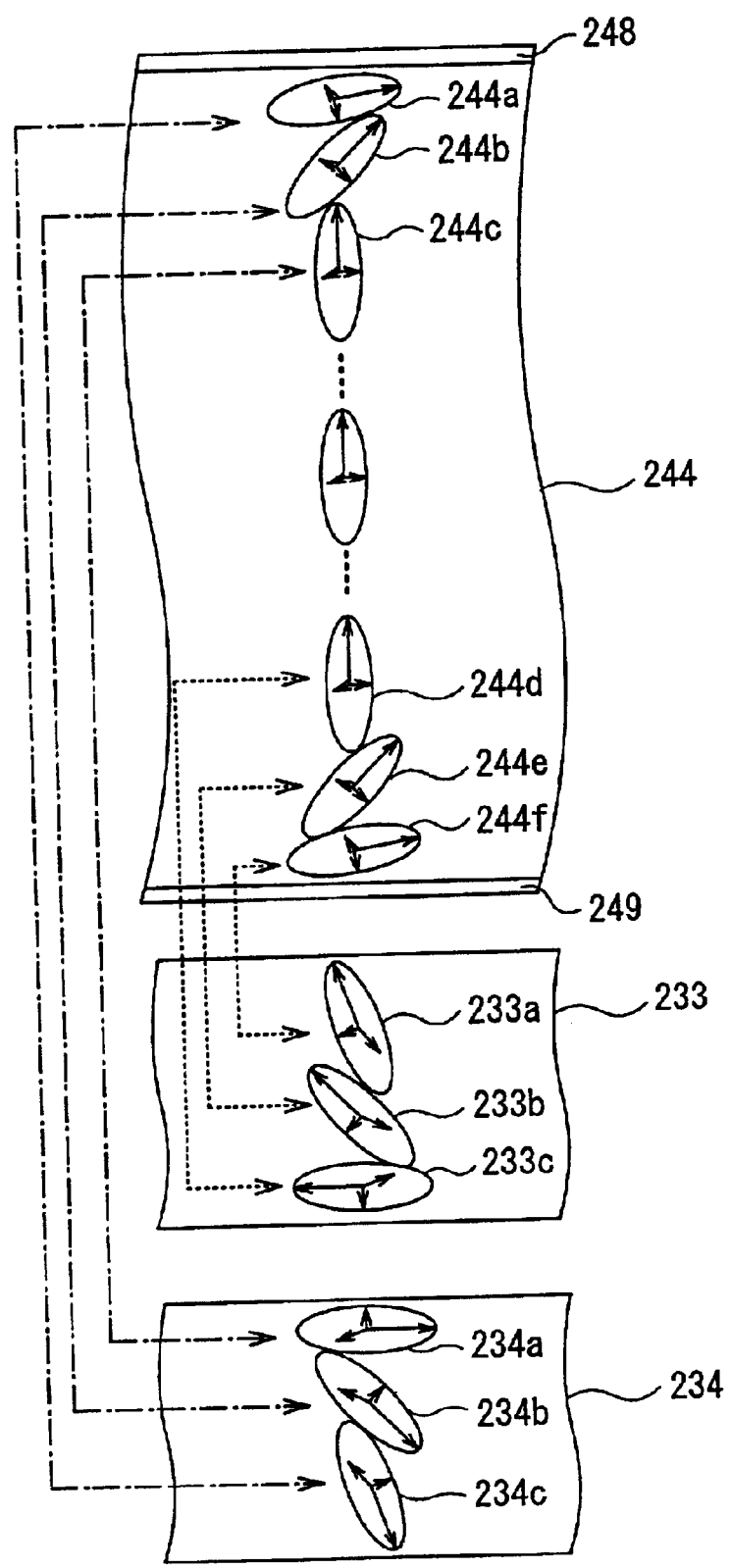
FIG. 26 illustrates the correlation between the alignment of liquid crystal molecules in the liquid crystal panel shown in FIG. 21 and the alignment of molecules in optical compensators.

FIG. 26 shows a schematic representation of the correlation between the alignment of liquid crystal molecules constituting the liquid crystal layer 244 and the alignment of internal substances constituting the optical compensators 233 and 234, using index ellipsoids. The alignment of liquid crystal molecules shown in FIG. 26 is an alignment in a state in which a voltage is applied to the liquid crystal layer 244. If the liquid crystal molecules are assumed to have positive uniaxial optical properties, the directions of the major axes of the molecules are the same as the directions of the optic axes of the molecules. As described above with reference to FIG. 24, the liquid crystal molecules in the conducting state are aligned so that the major axes (the optic axes) of the molecules gradually become upright (that is, parallel or about parallel to the optical axis 210) as they are situated closer to the central region of the liquid crystal layer 244. In FIG. 26, three liquid crystal molecules 244a, 244b and 244c whose optic axes gradually become upright in sequence as they are situated farther from the alignment layer 248 are present in the light-entry-side region. Also, three liquid crystal molecules 244f, 244e and 244d whose optic axes gradually become upright in sequence as they are situated farther from the alignment layer 249 are present in the light-exit-side region.

The substances constituting the optical compensator 234 are constituted so that the index ellipsoids thereof are upright in the same direction as the liquid crystal molecules to be compensated for (i.e., the liquid crystal molecules present in the light-entry-side region of the liquid crystal layer 244). If the substances constituting the optical compensator 234 are assumed to be negative uniaxial crystals, the substances are aligned so that the optic axes thereof gradually become perpendicular or about perpendicular to the optical axis 210 (parallel or about parallel to the plane of incidence of light) as they are situated farther from the light entry side and closer to the light exit side. In an example shown in FIG. 26, the optical compensator 234 is composed of three molecules 234a, 234b and 234c aligned in sequence when viewed from the light entry side, which correspond to the three liquid crystal molecules 244c, 244b and 244a of the liquid crystal layer 244, respectively. In the optical compensator 234, the optic axis of the molecule 234a is parallel to the optic axis of the liquid crystal molecule 244c, and the optic axis of the molecule 234b is parallel to the optic axis of the liquid crystal molecule 244b. In the optical compensator 234, the optic axis of the molecule 234c is parallel to the optic axis of the liquid crystal molecule 244a. This molecular alignment allows optical compensation for the liquid crystal molecule 244c to be made by the molecule 234a in the optical compensator 234, and allows optical compensation for the liquid crystal molecule 244b to be made by the molecule 234b in the optical compensator 234. This molecular alignment also allows optical compensation for the liquid crystal molecule 244a to be made by the molecule 234c in the optical compensator 234.

As in the case of the optical compensator 234, the substances constituting the optical compensator 233 are constituted so that the index ellipsoids thereof are upright in the same direction as the liquid crystal molecules to be compensated for (i.e., the liquid crystal molecules present in the light-exit-side region of the liquid crystal layer 244). In the example shown in FIG. 26, the optical compensator 233 is composed of three molecules 233a, 233b and 233c aligned in sequence when viewed from the light entry side, which correspond to the three liquid crystal molecules 244f, 244e and 244d of the liquid crystal layer 244, respectively. In the optical compensator 233, the optic axis of the molecule 233a is parallel to the optic axis, of the liquid crystal molecule 244f, and the optic axis of the molecule 233b is parallel to the optic axis of the liquid crystal molecule 244e. In the optical compensator 233, the optic axis of the molecule 233c is parallel to the optic axis of the liquid crystal molecule 244d. This molecular alignment allows optical compensation for the liquid crystal molecule 244f to be made by the molecule 233a in the optical compensator 233, and allows optical compensation for the liquid crystal molecule 244e to be made by the molecule 233b in the optical compensator 233. This molecular alignment also allows optical compensation for the liquid crystal molecule 244d to be made by the molecule 233c in the optical compensator 233.

In the field of the direct-vision type liquid crystal display apparatus, an optical compensator for improving the dependence on viewing angles has been heretofore developed. Optical compensators for improving the dependence on viewing angles include, for example, "Fuji WV Film Wide View A" (hereinafter referred to as "WV film") available from Fuji Photo Film Co., Ltd. The WV film is manufactured in the following manner: that is, a TAC (Tri-Acetyl Cellulose) film is coated with a polymer alignment layer, the polymer alignment layer is subjected to rubbing, then the rubbed polymer alignment layer is coated with a discotic liquid crystal, and the orientation and structure of the discotic liquid crystal are fixed. In the WV film, discotic liquid crystal molecules are hybrid oriented (that is, the discotic liquid crystal molecules are oriented so that the angles of inclination of the liquid crystal molecules change continuously in the direction of thickness). The discotic liquid crystal has a disc-shaped molecular structure and generally has optical properties of a negative crystal. It is possible that the discotic liquid crystal molecules for use in the WV film each have birefringence equivalent to birefringence of a negative uniaxial crystal. Therefore, for example, the discotic liquid crystal molecules are applied to a liquid crystal panel using a TN liquid crystal, whereby optical compensation can be provided for the liquid crystal panel. A structure of an optical compensation sheet equivalent to the WV film and a method of manufacturing the optical compensation sheet are described in, for example, Japanese Patent Application Publication Nos. Hei 7-333434 and Hei 8-5837, and so on. These publications give the names of specific substances of disc-shaped compounds available for the optical compensation sheet.

The above-mentioned WV film can be used as the optical compensators 233 and 234 of the embodiment. In other words, the disc-shaped compounds described in Japanese Patent Application Publication Nos. Hei 7-333434 and Hei 8-5837 and so on can be used as the substances constituting the optical compensators 233 and 234 and having the properties of the negative crystal. The substances constituting the optical compensators 233 and 234 are not limited to the substances described in the above-mentioned publications, and any substance can be used so long as it has the properties of the negative crystal capable of optically compensating for the liquid crystal in the liquid crystal layer 244.

Figure 25:
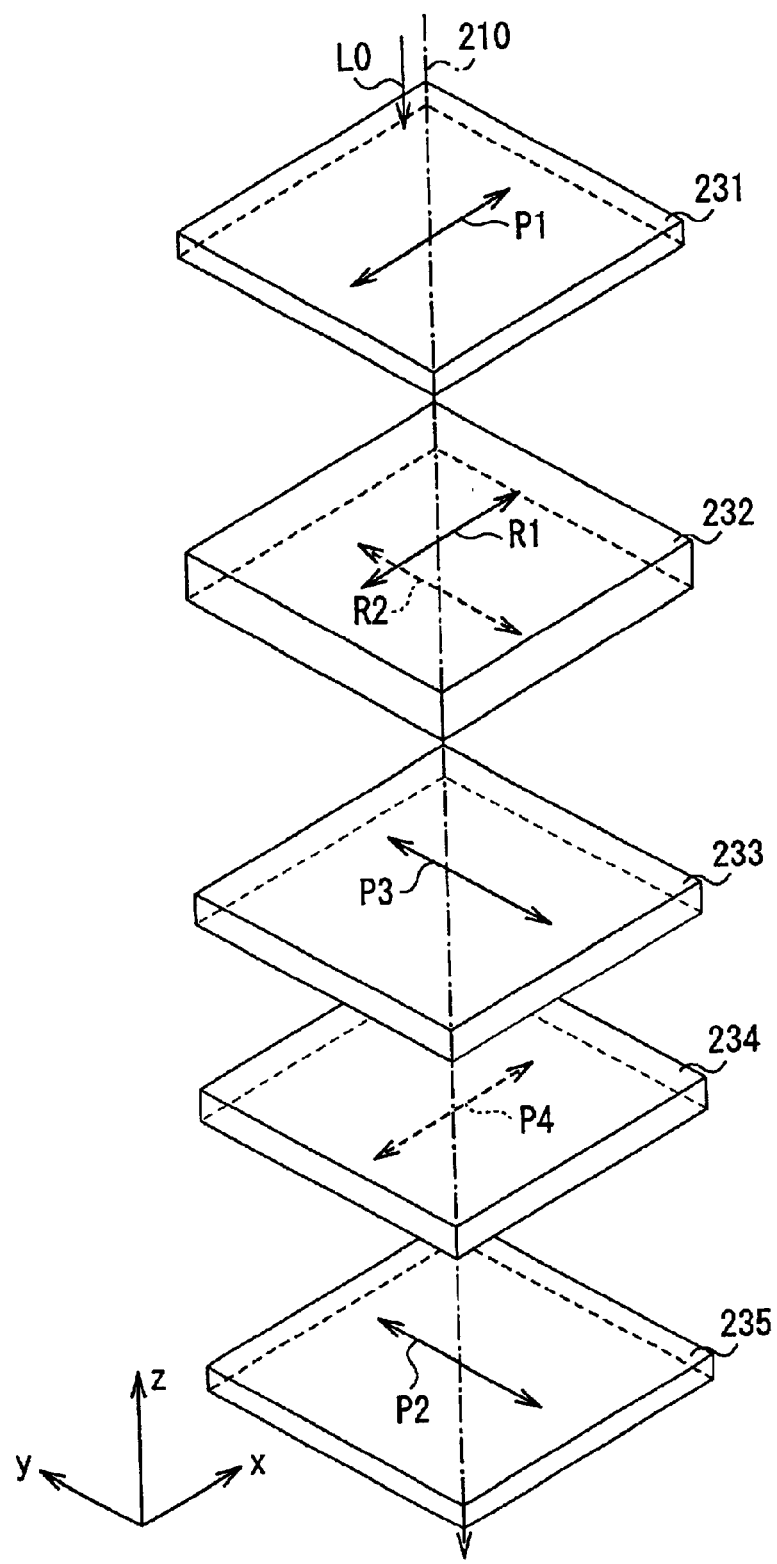
FIG. 25 illustrates various types of axial directions of optical elements of the liquid crystal panel portion shown in FIG. 21.

FIG. 25 shows various types of axial directions of the optical elements of the liquid crystal panel portion 224. As shown in FIG. 25, the entry-side polarizer 231 and the exit-side polarizer 235 are located so that the axes of light transmission P1 and P2 thereof cross at right angles, that is, the so-called crossed Nicols holds. The axis of transmission P1 of the entry-side polarizer 231 is set so that the direction thereof is the same as the rubbing direction R1 of the alignment layer 248 (see FIG. 22) of the liquid crystal panel 232. The axis of transmission P2 of the exit-side polarizer 235 is set so that the direction thereof is the same as the rubbing direction R2 of the alignment layer 249 (see FIG.

22) of the liquid crystal panel 232. That is, a mode of displaying an image in the liquid crystal panel portion 224 is the so-called normally white mode. The optical compensator 233 is located so that the direction of an optic axis P3 of the molecule present close to the light entry surface (i.e., the molecule 233a in FIG. 26) is substantially the same as the rubbing direction R2 of the alignment layer 249. The optical compensator 234 is located so that the direction of an optic axis P4 of the molecule present close to the light exit surface (i.e., the molecule 234c in FIG. 26) is substantially the same as the rubbing direction R1 of the alignment layer 248.

Next, the functions of the projection type liquid crystal display apparatus having the above-described configuration will be described.

Firstly, the description is given with reference to FIG. 20 with regard to the general function of the projection type liquid crystal display apparatus. First of all, white light emitted from the light source 211 passes through the TV/IR cut filter 212, which then eliminates light in the ultraviolet and infrared regions in the white light. After passing through the IV/IR cut filter 212, the light then passes through the fly-eye lenses 213 and 214, which then make the distribution of illuminance of the light uniform. After passing through the fly-eye lenses 213 and 214, the light then passes through the condenser lens 215 and thereafter impinges on the dichroic mirror 216. The light incident on the dichroic mirror 216 is divided into the red light LR and the other color light by the action of the dichroic mirror 216.

The red light LR, which the dichroic mirror 216 divides the incident light into, is reflected toward the liquid crystal panel portion 224R by the total reflection mirror 217. The red light LR reflected by the total reflection mirror 217 passes through the condenser lens 223R and then enters into the liquid crystal panel portion 224R. The red light LR entering into the liquid crystal panel portion 224R is spatially modulated in response to an image signal by the liquid crystal panel portion 224R, and then the modulated light enters into the dichroic prism 225 through the entry surface 225R of the dichroic prism 225.

The other color light, which the dichroic mirror 216 divides the incident light into, impinges on the dichroic mirror 218, which then divides the other color light into the green light LG and the blue light LB. The green light LG, which the dichroic mirror 218 divides the other color light into, passes through the condenser lens 223G and then enters into the liquid crystal panel portion 224G. The green light LG entering into the liquid crystal panel portion 224G is spatially modulated in response to an image signal by the liquid crystal panel portion 224G, and then the modulated light enters into the dichroic prism 225 through the entry surface 225G of the dichroic prism 225.

The blue light LB, which the dichroic mirror 218 divides the other color light into, passes through the relay lens 219 and then impinges on the total reflection mirror 220, which then reflects the blue light LB toward the total reflection mirror 222. The blue light LB reflected by the total reflection mirror 220 passes through the relay lens 221 and then impinges on the total reflection mirror 222, which then reflects the blue light LB toward the liquid crystal panel portion 224B. The blue light LB reflected by the total reflection mirror 222 passes through the condenser lens 223B and then enters into the liquid crystal panel portion 224B. The blue light LB entering into the liquid crystal panel portion 224B is spatially modulated in response to an image signal by the liquid crystal panel portion 224B, and then the modulated light enters into the dichroic prism 225 through the entry surface 225B of the dichroic prism 225.

The red light LR, the green light LG and the blue light LB entering into the dichroic prism 225 are combined by the action of the dichroic prism 225, and then combined light exits from the dichroic prism 225 to the projection lens 226 through the exit surface 225T. After exiting from the dichroic prism 225, the combined light is projected onto the front or rear of the screen 227 by the projection lens 226, so that an image is formed on the screen 227.

Next, the functions of the liquid crystal panel portion 224 will be described. When the red light LR, the green light LG and the blue light LB enter into the entry-side polarizer 231 (see FIG. 21), only linearly polarized light components having the same direction of vibration as the direction of the axis of transmission P1 (see FIG. 25) of the entry-side polarizer 231 pass through the entry-side polarizer 231. After passing through the entry-side polarizer 231, the light components then enter into the liquid crystal panel 232. By the action of the microlenses 242 (see FIG. 22), most of the light entering into the liquid crystal panel 232 enters into the liquid crystal layer 244 at a different angle from an angle of exit of the light to the entry-side polarizer 231.

In the conducting state in which a voltage is applied to the liquid crystal layer 244 of the liquid crystal panel 232 (see FIG. 24), the liquid crystal molecules are aligned so that the major axes of the molecules gradually become upright as they are situated farther from the alignment layers 248 and 249 and closer to the central region of the liquid crystal layer 244. In this state, light entering into the liquid crystal layer 244 is mainly subjected to birefringence due to the liquid crystal molecules present in the light-entry-side region and the liquid crystal molecules present in the light-exit-side region. The birefringence due to the liquid crystal molecules present in the light-exit-side region is canceled and thus eliminated by the optical compensator 233. The birefringence due to the liquid crystal molecules present in the light-entry-side region is canceled and thus eliminated by the optical compensator 234. The optical compensators 233 and 234 provide optical compensation as described above, whereby most of light entering into the exit-side polarizer 235 contains only light having the direction of vibration perpendicular to the axis of transmission P2 of the exit-side polarizer 235. The light having the above-mentioned direction of vibration is absorbed by the exit-side polarizer 235 and thus does not pass through the exit-side polarizer 235, so that the display status of an image is the so-called black-level display.

In a state in which no voltage is applied to the liquid crystal layer 244 (see FIG. 23), the optical rotatory power is generated by the twist of the liquid crystal, so that the direction of vibration of light is rotated by 90 degrees along the twist of the liquid crystal. Thus, the direction of vibration of light exiting from the liquid crystal panel 232 is the same as the direction of the axis of transmission P2 (see FIG. 25) of the exit-side polarizer 235, so that the light passes through the exit-side polarizer 235 via the optical compensators 233 and 234. After passing through the exit-side polarizer 235, the light is projected onto the screen 227 by the projection lens 226. At this time, the display status of an image is the so-called white-level display. Also in the state in which no voltage is applied to the liquid crystal layer 244, the light exiting from the liquid crystal panel 232 undergoes optical action of the optical compensators 233 and 234. However, the optical action in this state has little influence on the white-level display, and therefore the optical action does not become a practical problem in image display.

Figure 27:
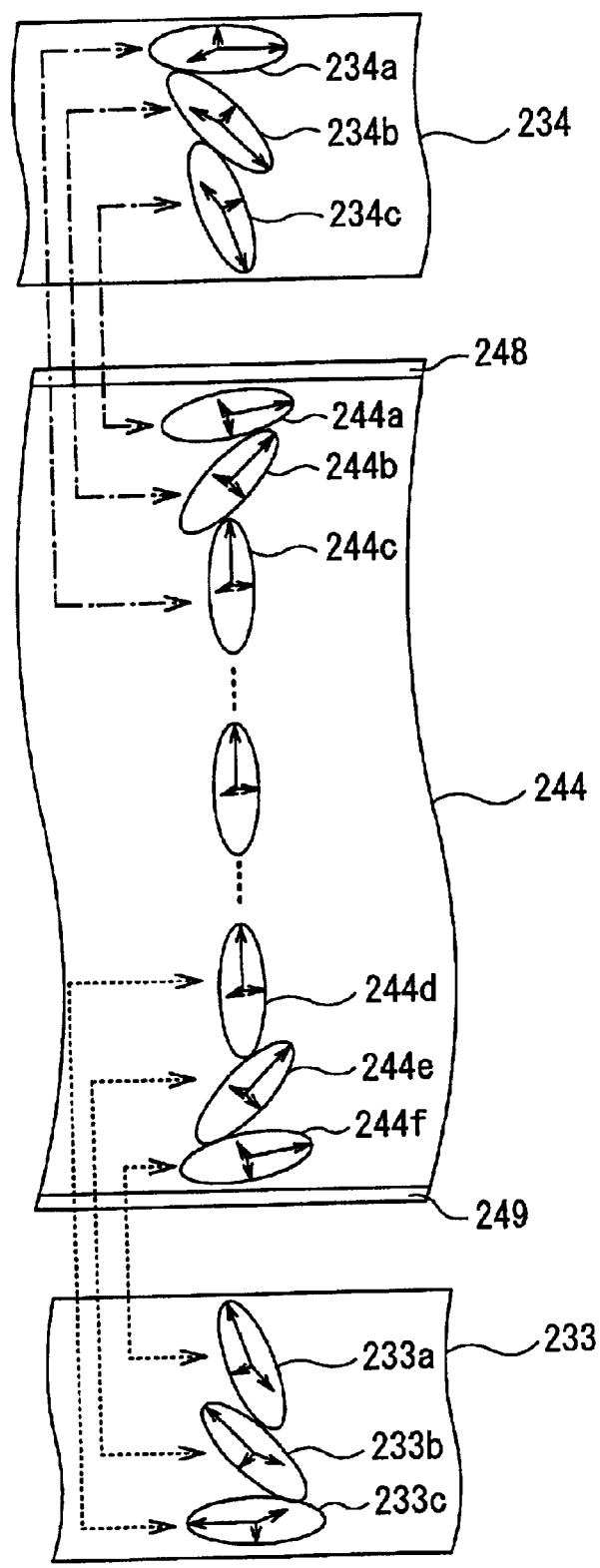
FIG. 27 illustrates a comparison to the correlation between the alignment of liquid crystal molecules shown in FIG. 24 and the alignment of molecules in the optical compensators.

FIG. 27 shows a comparison to the liquid crystal panel portion of the embodiment. In the comparison shown in FIG.

27, the optical compensator 234 is located between the entry-side polarizer 231 and the liquid crystal panel 232. In this case, in a stage before light enters into the liquid crystal panel 232, optical compensation is provided for the liquid crystal molecules present in the light-entry-side region of the liquid crystal layer 244. In this case, lens function of the microlenses 242 provided in the liquid crystal panel 232, however, makes a difference between an entry angle of most of incoming light to the optical compensator 234 and an entry angle of most of incoming light to the liquid crystal layer 244. The difference between the entry angles causes shift between the relative optical positions of the substances constituting the optical compensator 234 and the liquid crystal molecules to be compensated for, and thus makes sufficient optical compensation impossible. In the case of the configuration of the liquid crystal panel portion 224 of the embodiment shown in FIG. 26, the optical compensator 234 is located close to the light exit side of the liquid crystal panel 232, and therefore no difference is made between the entry angle of the incoming light to the optical compensator 234 and the entry angle of the incoming light to the liquid crystal layer 244, so that sufficient optical compensation can be provided.

As described above, according to the embodiment, the optical compensator 234 is provided close to the light exit side of the liquid crystal panel 232 so as to provide optical compensation for the liquid crystal molecules present in the light-entry-side region of the liquid crystal layer 244, and therefore the optical compensator 234 can eliminate the birefringence caused by the liquid crystal molecules present in the light-entry-side region, without being influenced by the microlenses 242 provided in the liquid crystal panel 232. Therefore, the embodiment can improve the black-level display without any influence of the microlenses 242 and thus can display a higher-contrast image as compared to the related art.

Although, in the embodiment, the optical compensator 233 is provided so as to compensate for not only the optical phase difference caused by the liquid crystal molecules in the light-entry-side region of the liquid crystal layer 244 but also the optical phase difference caused by the liquid crystal molecules in the light-exit-side region thereof, only the optical compensator 234 may be provided without providing the optical compensator 233. Also in this case, the optical compensator 234 can eliminate at least the birefringence caused by the liquid crystal molecules present in the light-entry-side region of the liquid crystal layer 244. In the embodiment, the description is given with regard to an example in which the microlenses 242 are provided in the liquid crystal panel 232, but the invention can be applied to the case where the microlenses 242 are not provided.

[Third Embodiment]

Next, the third embodiment of the invention will be described. In the following description, the same parts as the structural elements of the second embodiment are indicated by the same reference numerals, and the description thereof is appropriately omitted.

Figure 30:
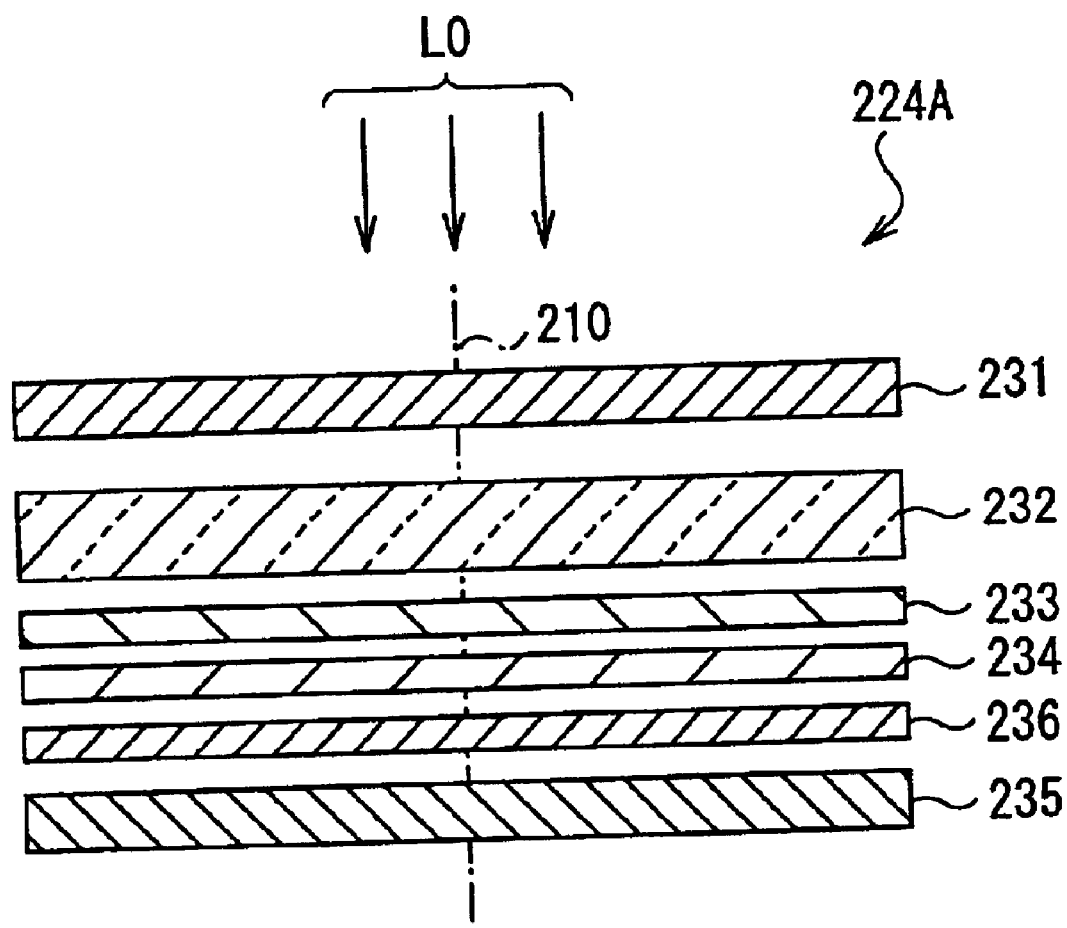
FIG. 30 is a cross sectional view of a general configuration of each of liquid crystal panel portions of a projection type liquid crystal display apparatus according to a third embodiment of the invention.

FIG. 30 shows a configuration of a principal part of each of liquid crystal panel portions of a projection type liquid crystal display apparatus according to the third embodiment of the invention. The configuration of the projection type liquid crystal display apparatus of the third embodiment is the same as the configuration of the above-described second embodiment, except for the configuration of the liquid crystal panel portion shown in FIG. 30. Also in the third embodiment, the configurations of the liquid crystal panel portions for three colors will be collectively described below because the liquid crystal panel portions for three colors have substantially the same function and configuration. A liquid crystal panel portion 224A (224R, 224G and 224B) of the third embodiment is different from the liquid crystal panel portion 224 shown in FIG. 21 in that the ark liquid crystal panel portion 224A has an optical compensator 236 provided between the optical compensator 234 and the exit-side polarizer 235. The optical compensator 236 functions to optically compensate for birefringence caused by liquid crystal molecules present in a middle portion of the liquid crystal layer 244. The optical compensator 236 corresponds to a specific example of "a third optical compensator" of the invention.

The position of the optical compensator 236 is not limited to the position shown in FIG. 30, and the optical compensator 236 can be located at any position so long as the optical compensator 236 is located between the liquid crystal panel 232 and the exit-side polarizer 235. For example, the optical compensator 236 can be located between the optical compensator 233 and the optical compensator 234 or between the liquid crystal panel 232 and the optical compensator 233. Although the optical compensator 236 is spaced away from the other optical elements in FIG. 30, the optical compensator 236 may be in close contact with another optical element, e.g., the optical compensator 234.

Figure 31:
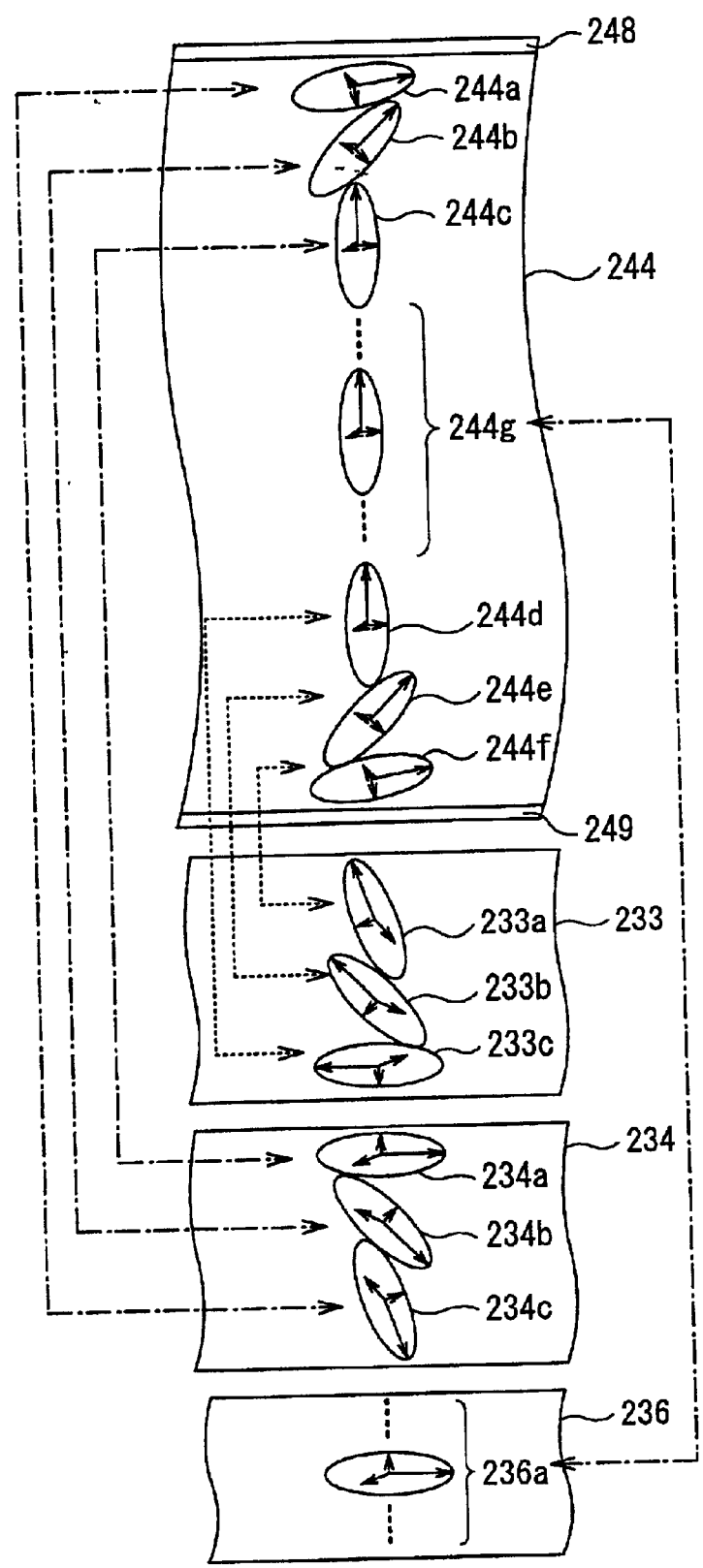
FIG. 31 illustrates the correlation between the alignment of liquid crystal molecules in the liquid crystal panel and the alignment of molecules in optical compensators in the third embodiment of the invention.

FIG. 31 shows a schematic representation of the correlation between the alignment of liquid crystal molecules constituting the liquid crystal layer 244 and the alignment of internal substances constituting the optical compensators 233, 234 and 236, using index ellipsoids. The alignment of liquid crystal molecules shown in FIG. 31 is an alignment in a state in which a voltage is applied to the liquid crystal layer 244. In the above-described second embodiment, the optical compensators 233 and 234 eliminate only the birefringence caused by the liquid crystal molecules present in the light-entry-side and light-exit-side regions of the liquid crystal layer 244. In the third embodiment, the optical compensator 236 additionally eliminates the birefringence caused by the liquid crystal molecules present in the middle portion of the liquid crystal layer 244.

As shown in FIG. 31, in a conducting state, liquid crystal molecules 244g present in the middle portion of the liquid crystal layer 244 are aligned with the major axes thereof perpendicular or about perpendicular to a plane of incidence of light (parallel or about parallel to the optical axis 210). If the liquid crystal molecules 244g are assumed to each have birefringence equivalent to birefringence of a positive uniaxial crystal, the optic axes of the liquid crystal molecules 244g are parallel to the optical axis 210, so that light entering into the liquid crystal layer 244 in parallel with the optical axis 210 are not subjected to birefringence. However, in actual fact, a lot of light enters into the liquid crystal layer 244 at an angle to the optical axis 210. When light thus enters into the liquid crystal layer 244 at an angle to the optical axis 210, the light enters into the liquid crystal molecules 244g at an angle to the optic axes of the liquid crystal molecules 244g, and thus the liquid crystal molecules 244g also cause birefringence. The optical compensator 236 cancels and thus eliminates the birefringence caused by light entering into the liquid crystal molecules 244g at an angle to the optic axes of the liquid crystal molecules 244g. Internal molecules 236a constituting the optical compensator 236 each have birefringence equivalent to birefringence of a negative uniaxial crystal, and, in a conducting state, the internal molecules 236a are aligned so that the optic axes thereof are parallel to the optic axes of the liquid crystal molecules 244g to be compensated for.

As in the case of the optical compensators 233 and 234, the disc-shaped compounds described in Japanese Patent Application Publication Nos. Hei 7-333434 and Hei 8-5837 and so on can be used as the substance constituting the optical compensator 236 and having the birefringence equivalent to the birefringence of the negative uniaxial crystal. The substance constituting the optical compensator 236 is not limited to the substances described in the above-mentioned publications, and any substance can be used so long as it has properties of the negative uniaxial crystal capable of optically compensating for the liquid crystal in the central region in the liquid crystal layer 244.

As described above, according to the third embodiment, in addition to the optical compensators 233 and 234, the third optical compensator 236 composed of the substance having the birefringence equivalent to the birefringence of the negative uniaxial crystal is provided close to the light exit side of the liquid crystal panel so as to eliminate the birefringence caused by the liquid crystal molecules present in the middle portion of the liquid crystal layer 244, so that the birefringence caused by the liquid crystal molecules can be eliminated over the overall liquid crystal layer 244 in the thickness direction of the liquid crystal layer 244. Therefore, the third embodiment can further improve the black-level display and thus can display a still-higher-contrast image.

Generally, in the direct-vision type liquid crystal display apparatus, the liquid crystal molecules present in the middle portion of the liquid crystal layer cause little birefringence because the liquid crystal panel is irradiated with light substantially parallel to the optical axis. Moreover, in the direct-vision type liquid crystal display apparatus, little deterioration in contrast occurs because no viewing angle is formed when the screen is viewed from the front. On the other hand, in the projection type liquid crystal display apparatus, light generally enters into the liquid crystal panel at various angles. Moreover, an image finally projected on the screen is an image formed through integration of light entering at various angles. It can be therefore seen that the optical compensator 236 of the third embodiment has much effect on improvement in contrast of the projection type liquid crystal display apparatus.

The invention is not limited to the above-described embodiments, and various modifications of the invention are possible. For example, the invention is not limited to a three-panel projection type liquid crystal display apparatus but can be applied to a single-panel projection type liquid crystal display apparatus. The invention can be also applied to a projection type liquid crystal display apparatus using a liquid crystal other than a nematic liquid crystal.

As described above, according to the projection type liquid crystal display apparatus of one embodiment of the invention, the first optical compensator is located on the light exit side with respect to the liquid crystal display device so as to compensate for the optical phase difference caused by the liquid crystal molecules in the light-entry-side region of the liquid crystal layer. Therefore, for example, even when the liquid crystal display device comprises a plurality of microlenses on the light entry side thereof, the first optical compensator can compensate for the optical phase difference caused by the liquid crystal molecules in the light-entry-side region without being influenced by the microlenses, so that the apparatus can improve the black-level display and thus can display a higher-contrast image as compared to the related art.

The projection type liquid crystal display apparatus of another embodiment of the invention further comprises a third optical compensator located on the light exit side with respect to the liquid crystal display device, the third optical compensator for compensating for an optical phase difference caused by liquid crystal molecules present in a region of the liquid crystal layer excluding the light-entry-side region and the light-exit-side region. Therefore, for example, in the case where each of the liquid crystal molecules in the liquid crystal layer has birefringence equivalent to birefringence of a positive uniaxial crystal and where, in a state in which a voltage is applied to the liquid crystal layer, the liquid crystal molecules in the liquid crystal layer are realigned so that the major axes of the molecules change in position from a position parallel or about parallel to a plane of incidence of light to a position perpendicular or about perpendicular to the plane of incidence of light as they are situated farther from the light-entry-side region of the liquid crystal layer and closer to the center of the liquid crystal layer, the molecules of the third optical compensator are aligned so that the optic axes thereof are parallel to the major axes of the liquid crystal molecules to be compensated for, whereby the third optical compensator can compensate for not only the optical phase difference caused by the liquid crystal molecules in the light-entry-side region but also the optical phase difference caused by the liquid crystal molecules present in the region excluding the light-entry-side region and the light-exit-side region. This allows displaying a still-higher-contrast image.

While the invention has been described with reference to specific embodiments chosen for purpose of illustration, it should be apparent that numerous modifications could be made thereto by those skilled in the art without departing from the basic concept and scope of the invention.

What is claimed is:

1. A liquid crystal display projector comprising:

a light source for emitting light required for image display;

a transmission type liquid crystal display device having a liquid crystal layer having an alignment of a plurality of twisted liquid crystal molecules, the liquid crystal display device for selectively applying a voltage to the liquid crystal layer in response to an image signal, thereby realigning the liquid crystal molecules and thus modulating light passing through the liquid crystal layer;

a projection lens for projecting the light modulated by the liquid crystal display device;

a polarizer for allowing linearly polarized light, which is contained in light emitted from the light source, to enter into the liquid crystal display device;

an analyzer for allowing linearly polarized light, which is contained in light exiting from the transmission type liquid crystal display device, to enter into the projection lens; and a first optical compensator located between the liquid crystal display device and the analyzer on a light exit side of the liquid crystal display device and containing a substance having birefringence equivalent to birefringence of a negative crystal, the first optical compensator for compensating for an optical phase difference caused by liquid crystal molecules in a light-entry-side region of the liquid crystal layer;

a second optical compensator located on the light exit side with respect to the liquid crystal display device and containing a substance having birefringence equivalent to birefringence of a negative crystal, the second optical compensator for compensating for an optical phase difference caused by liquid crystal molecules in the light-exit-side region of the liquid crystal layer; and a third optical compensator located on the light exit side with respect to the liquid crystal display device, the third optical compensator for compensating for an optical phase difference caused by liquid crystal molecules present in a region of the liquid crystal layer excluding the light-entry-side region and the light-exit-side region.

2. A liquid crystal display projector according to claim 1, wherein the third optical compensator contains a substance having birefringence equivalent to birefringence of a negative uniaxial crystal.

3. A liquid crystal display projector according to claim 2, wherein each of the liquid crystal molecules in the liquid crystal layer has birefringence equivalent to birefringence of a positive uniaxial crystal; in a state in which a voltage is applied to the liquid crystal layer, the liquid crystal molecules in the liquid crystal layer are realigned so that the major axes of the molecules change in position from a position parallel or about parallel to a plane of incidence of light to a position perpendicular or about perpendicular to the plane of incidence of light as they are situated farther from the light-entry-side and light-exit-side regions of the liquid crystal layer and closer to the center of the liquid crystal layer; the third optical compensator functions to compensate for an optical phase difference caused by light entering into the liquid crystal molecules aligned with the major axes thereof perpendicular to the plane of incidence of light, at an angle to the major axes thereof; and, in a state in which a voltage is applied to the liquid crystal layer, molecules of the substance constituting the third optical compensator and having the birefringence are aligned so that the optic axes of the molecules are parallel to the major axes of the liquid crystal molecules to be compensated for.

4. A liquid crystal display projector according to claim 1, wherein a plurality of microlenses for focusing incoming light on the liquid crystal layer are provided close to the light entry side of the liquid crystal layer.

5. A liquid crystal display projector according to claim 1 further comprising a pair of polarizers located on the light entry side and the light exit side with respect to the liquid crystal display device and located so that the crossed Nicols holds, wherein the first optical compensator and the second optical compensator are located between the polarizer located on the light exit side and the liquid crystal display device.

* * * * *